United States Patent
Wold

(10) Patent No.: US 9,464,553 B2
(45) Date of Patent: Oct. 11, 2016

(54) POWER GENERATION SYSTEM

(71) Applicant: Clean Power Providers LLC, Laguna Niguel, CA (US)

(72) Inventor: Magnus L. Wold, Fontana, CA (US)

(73) Assignee: Bill Marti, Encinitas, CA (US)

( * ) Notice: Subject to any disclaimer, the term of this patent is extended or adjusted under 35 U.S.C. 154(b) by 82 days.

(21) Appl. No.: 14/216,757

(22) Filed: Mar. 17, 2014

(65) Prior Publication Data

US 2014/0261253 A1 Sep. 18, 2014

Related U.S. Application Data

(60) Provisional application No. 61/798,658, filed on Mar. 15, 2013.

(51) Int. Cl.

| | |
|---|---|
| *F01N 5/02* | (2006.01) |
| *C25B 9/00* | (2006.01) |
| *C25B 1/04* | (2006.01) |
| *F02C 3/22* | (2006.01) |
| *F02C 3/34* | (2006.01) |
| *F02M 25/12* | (2006.01) |
| *F01N 5/04* | (2006.01) |
| *F02M 21/02* | (2006.01) |
| *F01K 21/04* | (2006.01) |
| *F01K 23/06* | (2006.01) |
| *F02G 5/00* | (2006.01) |
| *F02B 41/10* | (2006.01) |
| *F02B 37/00* | (2006.01) |

(52) U.S. Cl.
CPC . *F01N 5/02* (2013.01); *C25B 1/04* (2013.01); *C25B 9/00* (2013.01); *F01K 21/04* (2013.01); *F01K 23/065* (2013.01); *F01N 5/04* (2013.01); *F02C 3/22* (2013.01); *F02C 3/34* (2013.01); *F02M 21/0206* (2013.01); *F02M 25/12* (2013.01); *F01N 2240/02* (2013.01); *F02B 37/00* (2013.01); *F02B 41/10* (2013.01); *F02G 5/00* (2013.01); *Y02E 60/366* (2013.01); *Y02T 10/121* (2013.01); *Y02T 10/16* (2013.01); *Y02T 10/166* (2013.01); *Y02T 10/32* (2013.01)

(58) Field of Classification Search
CPC ......... F01N 5/02; C25B 1/04; F01K 23/065; F01K 21/06; Y02E 60/36
See application file for complete search history.

(56) References Cited

U.S. PATENT DOCUMENTS

| | | | |
|---|---|---|---|
| 8,168,047 B1* | 5/2012 | Smith | C25B 1/06 123/3 |
| 2002/0098394 A1 | 7/2002 | Keefer et al. | |
| 2004/0013918 A1 | 1/2004 | Merida-Donis | |
| 2005/0217991 A1 | 10/2005 | Dahlquist, Jr. | |
| 2007/0044479 A1 | 3/2007 | Brandt et al. | |
| 2007/0138006 A1 | 6/2007 | Oakes et al. | |

* cited by examiner

*Primary Examiner* — Lindsay Low
*Assistant Examiner* — Kevin Lathers
(74) *Attorney, Agent, or Firm* — Snell & Wilmer LLP

(57) ABSTRACT

An internal combustion engine is powered on or using a mix of a liquid fuel and hydrogen, to produce energy that is converted into electricity using an alternator, which is subsequently used to produce hydrogen. The hydrogen is produced through the use of hydrogen generating cells which breaks down water using electrolysis and outputs hydrogen. The cell uses anode rods inserted into a tank containing cathode tubes. Additionally, the tank itself also acts as the cathode as the tank is connected to the negative end of a circuit. A current passes from the anode rods to the cathode through water to produce hydrogen. Hydrogen is off gassed and stored in a reservoir to be used in an internal combustion engine as fuel. The energy needed to perform electrolysis is garnered from an alternator and a turbine that is part of the system.

9 Claims, 31 Drawing Sheets

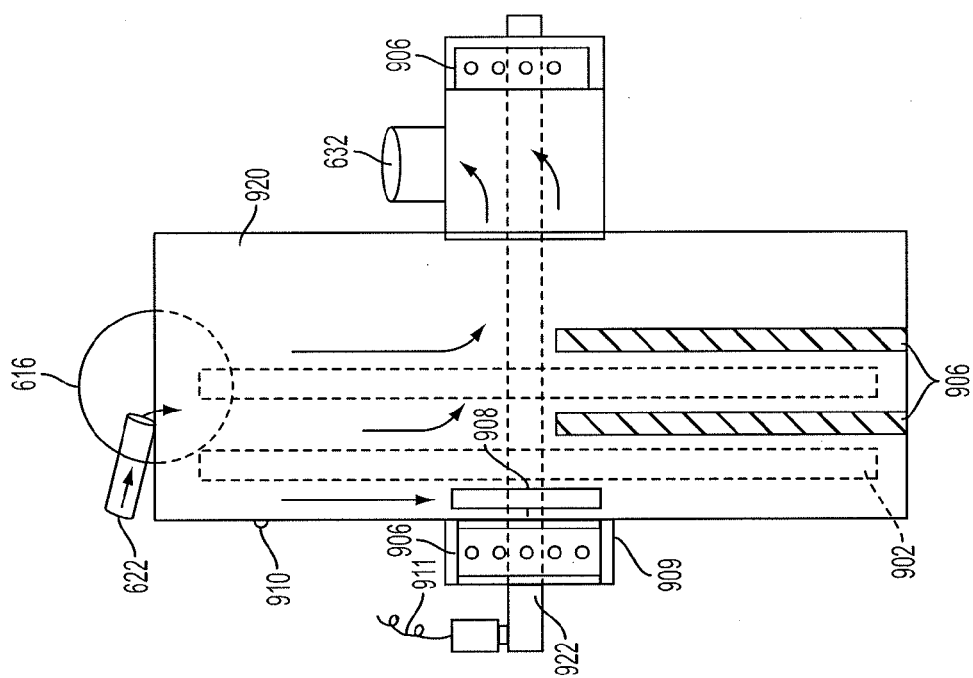
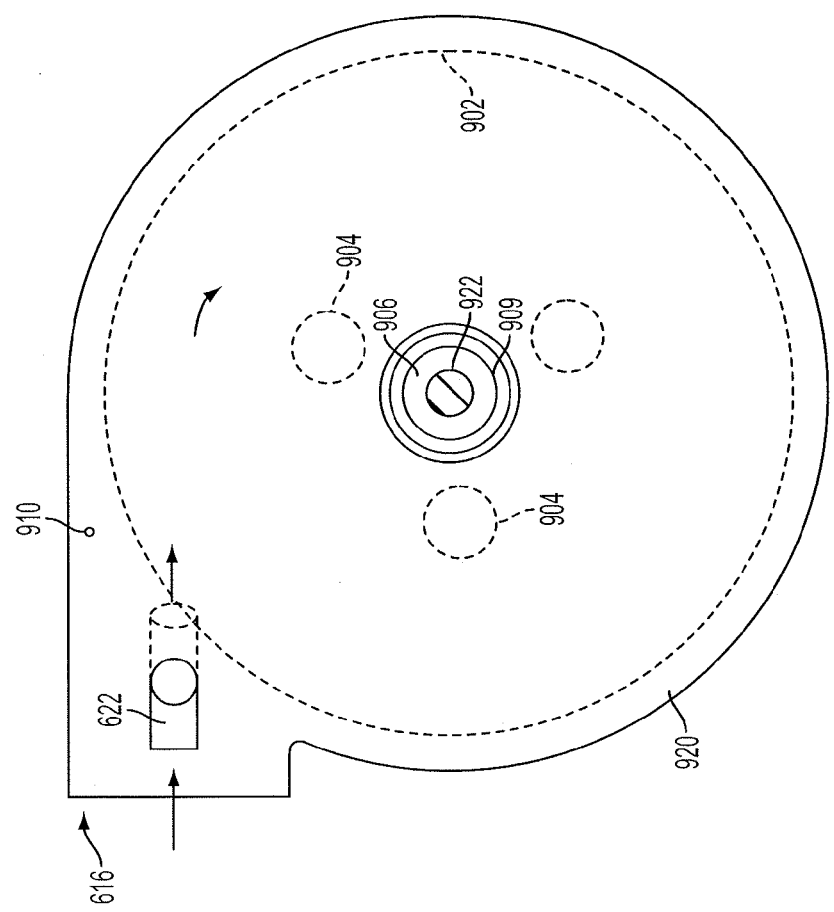
FIG. 9B
FIG. 9A

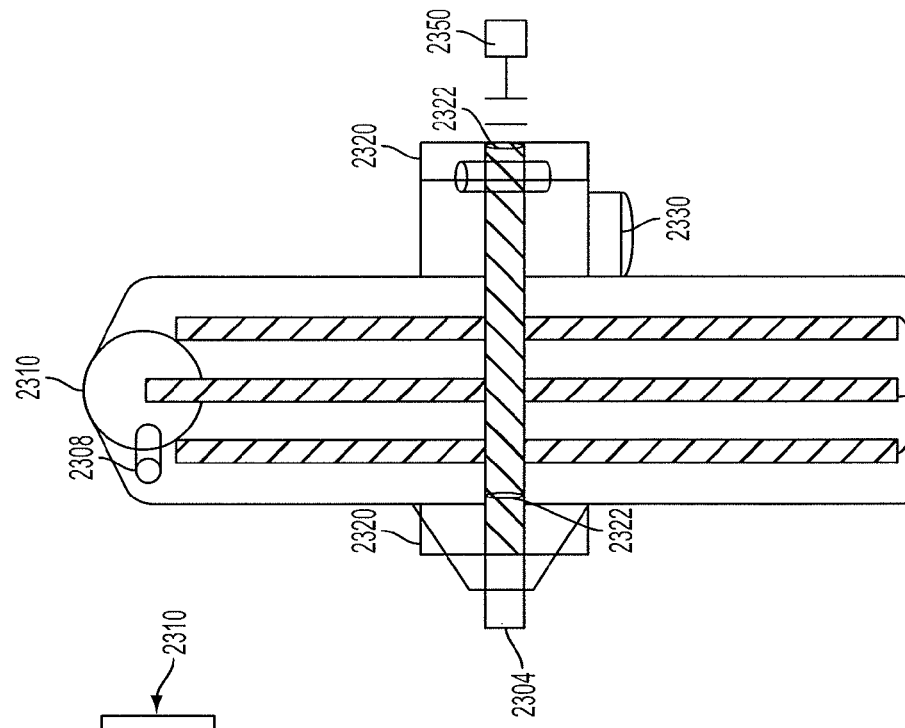
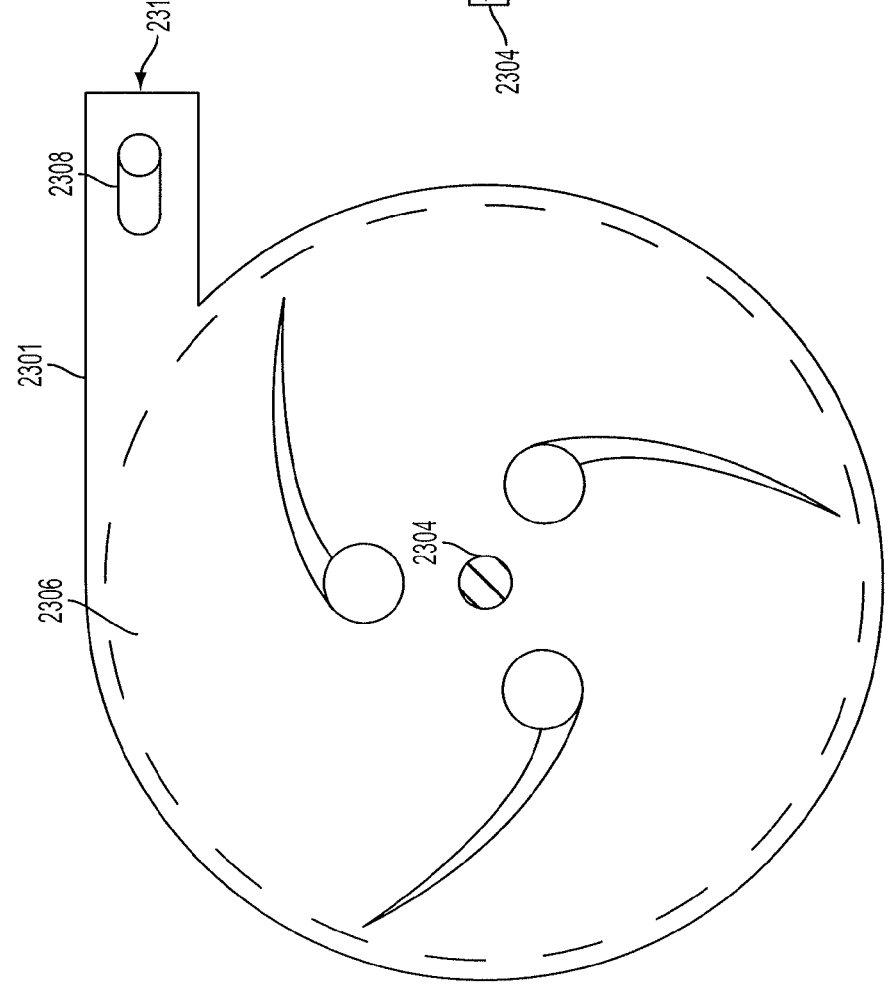

POWER GENERATION SYSTEM

CROSS REFERENCE TO RELATED APPLICATIONS

This patent application claims the benefit and priority of U.S. Provisional Application No. 61/798,658, filed on Mar. 15, 2013, the entire contents of which are hereby incorporated by reference herein.

BACKGROUND

1. Field

The present disclosure generally relates to hydrogen generators. More specifically, the present invention relates to hydrogen generators as part of an internal combustion engine system.

2. Description of the Related Art

Hydrogen has long been known as a potential alternative energy source. It is a zero-carbon-emission fuel because when burned, pure hydrogen gas ($H_2$) reacts with oxygen ($O_2$) to form water ($H_2O$).

Unfortunately, hydrogen gas is extremely light and rises in the atmosphere. Therefore there are few natural sources of hydrogen available on the planet, which means it serves more as an energy carrier than an actual energy source. Hydrogen gas can be manufactured through electrolysis, running electricity through water, or by separating it from methane. The latter method releases carbon emissions. A major barrier to the production of hydrogen through electrolysis is the net energy loss associated with the process. In order to break down water into hydrogen and oxygen, it takes more energy then you retrieve from subsequently burning that hydrogen.

Hydrogen gas, once obtained can be utilized in a fuel cell, where it acts as an electrolyte to produce electricity, or can be burned to run a combustion engine. However, as discussed, a problem arises in obtaining hydrogen for such uses. Usually hydrogen for fuel use is obtained directly from hydrocarbons or the expenditure of energy from other sources, such as the burning of hydrocarbons or alternative energy sources.

SUMMARY

The disclosure uses an internal combustion engine, powered on a mix of a liquid fuel (e.g., natural gas or gasoline) and hydrogen, to produce energy that is converted into electricity using an alternator, which is subsequently used to produce hydrogen.

The hydrogen is produced through the use of hydrogen generating cells which breaks down water using electrolysis and output hydrogen. The cell uses anode rods inserted into a tank containing cathode tubes. Additionally, the tank itself also acts as the cathode as the tank is connected to the negative end of a circuit. The tank is in conductive communication with the cathode tubes. A current passes from the anode rods to the cathode through water to produce hydrogen. Hydrogen is off gassed and stored in a reservoir to be used in an internal combustion engine as fuel. The hydrogen is used to aid in the powering of the internal combustion engine. The energy needed to perform electrolysis is garnered from an alternator and a turbine that is part of the system.

The system combines a hydrogen generator with an exhaust gas turbine to retrieve energy from the heat of the exhaust gases. The turbine is powered off of heat and exhaust from the internal combustion engine. This heats up water to produce steam, which in turn powers a turbine that produces energy for the hydrogen cells. This energy recovered from the heat of the exhaust is supposed to lead to a net energy gain for the system over a system run purely on an internal combustion engine.

Additionally, a power generation system may use the exhaust gases from the internal combustion engine to run a motor. The motor, powered off the flow of exhaust gases may produce an electric current to perform electrolysis on the exhaust gases themselves, thereby producing a fractured exhaust gas that may be re-burned by the engine.

BRIEF DESCRIPTION OF THE DRAWINGS

A more complete understanding of the present disclosure may be derived by referring to the detailed description and claims when considered in connection with the figures, wherein like reference numbers refer to similar elements throughout the figures, and:

FIG. 9A is a side view of the components of an exhaust gas turbine, in accordance with various implementations;

FIG. 9B is a front view of an exhaust gas turbine, in accordance with various implementations;

FIG. 23A is a side view of the steam turbine, in accordance with various implementations;

FIG. 23B is a front view of the steam turbine, in accordance with various implementations;

DETAILED DESCRIPTION

The detailed description herein makes use of various exemplary embodiments with reference to drawings. While these embodiments are described in sufficient detail to enable those skilled in the art to practice the disclosure, it should be understood that other embodiments may be realized and that modifications of structures, arrangements, applications, proportions, elements, materials, or components used in the practice of the instant disclosure, in addition to those not specifically recited, can be varied or otherwise particularly adapted to specific environments, manufacturing specifications, design parameters or other operating requirements without departing from the scope of the present disclosure and are intended to be included in this disclosure. Thus, the detailed description herein is presented for purposes of illustration only and not of limitation.

Figure 1:
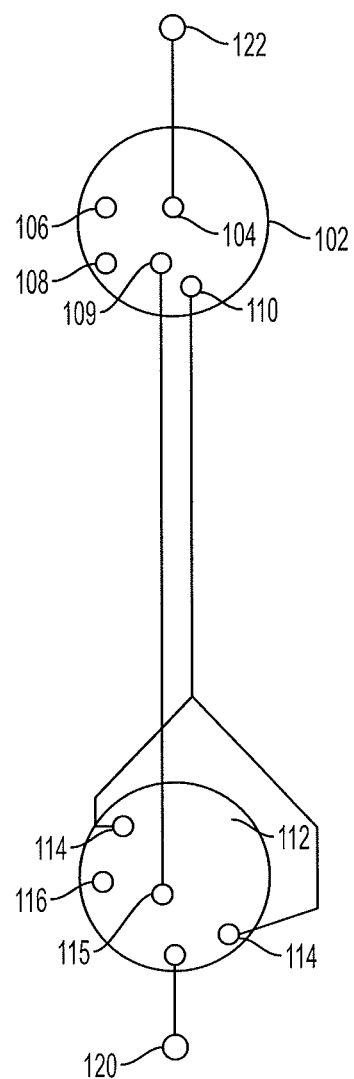
FIG. 1 is a schematic diagram illustrating components of a reservoir and an electrolysis cell, in accordance with various implementations.

In accordance with various implementations, FIG. 1 illustrates an internal combustion generator system having a reservoir 102 and an electrolysis cell 112. The reservoir 102 may contain HHO, a gas of two parts hydrogen gas ($2H_2(g)$) and one part oxygen gas ($O_2(g)$) (collectively referred to herein as "HHO"), and/or water ($H_2O$). The electrolysis cell 112 may also contain HHO and/or $H_2O$. The reservoir 102 and the electrolysis cell 112 may be connected with one another in order to exchange HHO and/or $H_2O$.

Reservoir 102 may comprise a pressure sensor 106 and a fluid level sensor 108. Pressure sensor 106 is configured to measure and display the pressure within reservoir 102. In one embodiment, pressure sensor 106 may measure the pressure of HHO in reservoir 102. Fluid level sensor 108 is configured to measure and display the level of fluid in the reservoir 102. In one embodiment, fluid level sensor 108 may measure the level of $H_2O$ in the reservoir 102.

Reservoir 102 may comprise HHO inlet 109, $H_2O$ outlet 110, and HHO outlet 104. HHO inlet 109 may be configured to receive HHO from electrolysis cell 112. $H_2O$ outlet 110 may send $H_2O$ to electrolysis cell 112 in order to produce HHO. HHO outlet 104 may direct HHO towards the intake of an internal combustion engine 420 as illustrated in an embodiment in FIG. 4. In one embodiment, HHO outlet 104 may include valve 122 operable to control the flow of HHO out of reservoir 102. Valve 122, for example, may be an electromechanical switch (referred to herein as a solenoid), or any such device that is operable to control the flow of gas.

Electrolysis cell 112 may comprise a temperature sensor 116, the temperature sensor 116 configured to measure and display the temperature inside the electrolysis cell 112.

Electrolysis cell 112 may comprise $H_2O$ inlets 114, valve 120, and HHO outlet 115. $H_2O$ inlets 114 may receive $H_2O$ from reservoir 102. In one embodiment, $H_2O$ inlets may be located on opposing sides of the electrolysis cell 112. Valve 120 may be operable to control flow of $H_2O$ into or out of electrolysis cell 112. In one example, valve 120 may be an electric solenoid operated by a control computer. HHO outlet 115 may be operable to direct HHO out of the electrolysis cell 112 and towards reservoir 102. In one embodiment, HHO outlet 115 may be located at the top of electrolysis cell 112.

Figure 2:
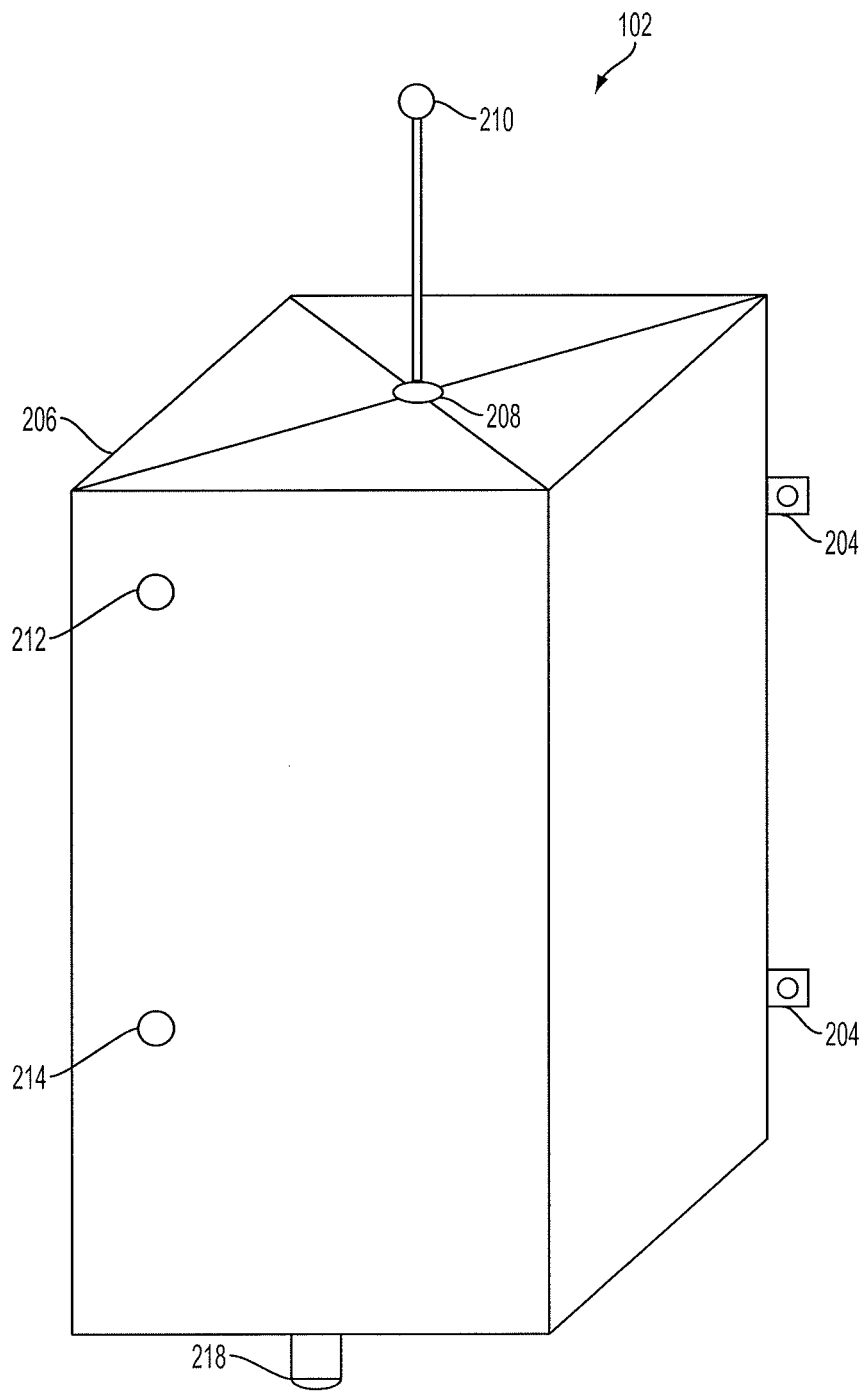
FIG. 2 is an isometric view of an reservoir, in accordance with various implementations, in accordance with various implementations.

In accordance with various implementations, FIG. 2 illustrates reservoir 102, which may include a sealed container or vessel. The reservoir 102 may comprise any material, for example stainless steel. FIG. 2 illustrates a rectangular prism with four sides, a top and a bottom. However, it may be understood that the reservoir 102 may be any three dimensional shape. In other implementations, the reservoir 102 may be any shape or size. For example, the reservoir 102 may be a six inch by four inch by four inch prism. Dimensions of the reservoir 102 will change according to the size of the internal combustion (IC) engine and/or turbine.

In various implementations, the top side 206 of reservoir 102 may comprise a shape configured to direct vapor to the location wherein HHO exits the reservoir through HHO outlet 208. For example, the top side 206 may be in a pyramid shape tilting the four sides of top side 206 to HHO outlet 208 as illustrated in FIG. 2. HHO outlet 208 may include a valve 210 operable to control the flow of HHO out of reservoir 102. Valve 210 may be, for example, an electromechanical switch (referred to herein as a solenoid) operated by a control panel. HHO outlet 208 may correspond to HHO outlet 104 from FIG. 1. Valve 210 may correspond to valve 122 from FIG. 1.

Reservoir 102 may further comprise mounting brackets 204. For example, mounting brackets 204 may be tabs attached to one wall of the reservoir 102, as illustrated in FIG. 2, in order to fix reservoir 102 to a wall or the like.

Reservoir 102 may comprise pressure sensor 212, which may correspond to pressure sensor 106. In one embodiment, pressure sensor 212 may be located in the upper third of reservoir 102 and may sense the pressure of HHO stored in reservoir 102, as illustrated in FIG. 2. For example, pressure sensor 212 may measure internal reservoir pressure from 0-30 psi. Reservoir 102 may also comprise fluid level sensor 214, which may correspond to fluid level sensor 108. In one embodiment, fluid level sensor 214 may be located midway up the reservoir 102 and may sense the fluid level of $H_2O$ stored in reservoir 102.

Reservoir 102 may comprise HHO inlet 218, which may correspond to HHO inlet 109. As illustrated in FIG. 2, in one embodiment, HHO inlet 218 may be located on the bottom of reservoir 102 and may be operable to receive HHO from electrolysis cell 112.

Figure 3:
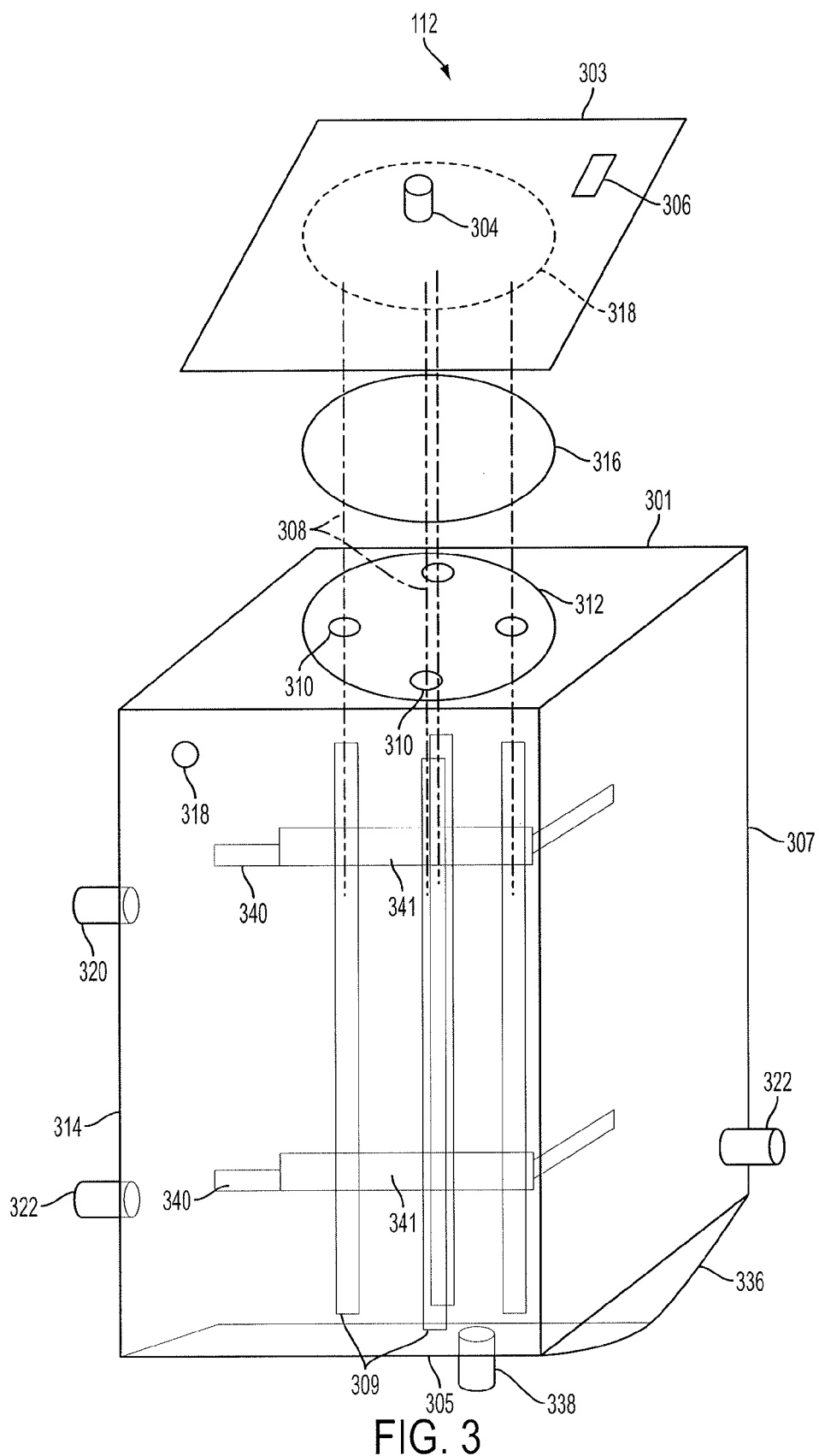
FIG. 3 is a cross-sectional view illustrating internal components of an electrolysis cell, in accordance with various implementations.

In accordance with various implementations, FIG. 3 illustrates electrolysis cell 112, which may serve to separate $H_2O$ into HHO through electrolysis. Electrolysis is a method of using direct current (DC) to drive an otherwise non-spontaneous chemical reaction. Here it is used to spur the chemical separation of $H_2O$.

Electrolysis cell 112 may comprise a container having various walls of any dimension and/or shape. In one example, the electrolysis cell 112 walls may include a container top 301, a container bottom 305, and one or more container vertical walls 307. Container top 301, container bottom 305, and container vertical walls 307 may be connected together (e.g., welded) in such a way as to form a container that is operable to contain $H_2O$ and/or HHO. The container top 301, container bottom 305, and/or container vertical walls 307 may be made out of any suitable material. In one example, the material may be 1/16 inch thick stainless steel. Container bottom 305 may comprise a sloped bottom 336.

Electrolysis cell 112 may further comprise a top plate 303. Top plate 303 may be operable as a conductor for an anode. Electrolysis cell 112 may comprise anode element 308. Top plate 303 and anode element 308 may be in conductive communication. Anode element 308 may be configured as any electrolysis anode known in the art. In various examples, anode element 308 may be a long cylindrical rod. One or more anode elements 308 may be included. Electrolysis cell 112 may comprise an internal anode bracket (not shown). Internal anode bracket may be for example a 3/4 inch band configured to hold separate anode elements 308 in place relative to one another. In various examples, three anode elements 308 may be used, forming a delta or triangular shape with the anode bracket making the periphery of the triangle. In various examples, three anode elements 308 may be used to form a triangle with the anode bracket forming a "Y" shape by connecting at a vertex in the middle of the triangle formed by the anode elements 308. In another example, four anode elements 308 and anode bracket may form a square as illustrated in FIG. 3. The top plate 303 may comprise a DC voltage positive connection terminal 306. Top plate 303 may also comprise HHO outlet 304, which may correspond to HHO outlet 115. HHO outlet 304 may be configured to direct HHO out of the top of electrolysis cell 112 towards reservoir 102.

Container top 301 of electrolysis cell 112 may include one or more holes 310 for anode elements 308 to pass through into the container portion of electrolysis cell 112. Electrolysis cell 112 may comprise $H_2O$ inlet 322, which may correspond to $H_2O$ inlet 114. $H_2O$ inlet 322 may be located in the container top 301, container bottom 305, container vertical walls 307, and/or top plate 303. $H_2O$ inlet 322 may be operable to receive $H_2O$ into the electrolysis cell 112. Electrolysis cell 112 may include one or more $H_2O$ inlets 322. For example, as shown in FIG. 3, electrolysis cell 112 may have two $H_2O$ inlets 322 on opposing container vertical walls 307 when electrolysis cell 112 is a prism.

Electrolysis cell 112 may comprise cathode element 314. Cathode element 314 may include part of or the entire container portion of electrolysis cell 112. Electrolysis cell 112 may comprise cathode tubes 309. In various examples, cathode tubes 309 may be titanium. Cathode tubes 309 may be retained within the container by brackets 341. Cathode element 314 and cathode tubes 309 may be in conductive communication with one another through a connection 340 between brackets 341 and container walls 307. Cathode tubes 309 may be hollow. Cathode tubes 309 may be in the same configuration as anode elements 308 so that cathode tubes 309 may receive anode elements 308 into their hollow center when the anode elements 308 are installed within the interior of the container. The container may have a DC voltage negative connection terminal 320. With the cathode element 314 and the cathode tubes 309 in conductive communication, both the cathode element 314 and the cathode tubes 309 may operate as a cathode in the system.

Electrolysis cell 112 may comprise a plastic or rubber (e.g., Teflon®) ring 312 and gasket 316. Gasket 316 may, for example, be an O-ring configured to seal the area around the holes 310 between container top 301 and top plate 303. Top plate 303 and container top 301 may be insulated from one another by gasket 316, Teflon® ring 312, or any insulation material known to one of ordinary skill in the art. By keeping top plate 303, which is positively charged, insulated from negatively charged portions of the container, electrolysis cell 112 may operate to perform an electrolytic reaction separating $H_2O$ into HHO.

Electrolysis cell 112 may comprise temperature sensor 318, which may correspond to temperature sensor 116. Temperature sensor 318 may be configured to measure and display the temperature inside the electrolysis cell 112.

Figure 11:
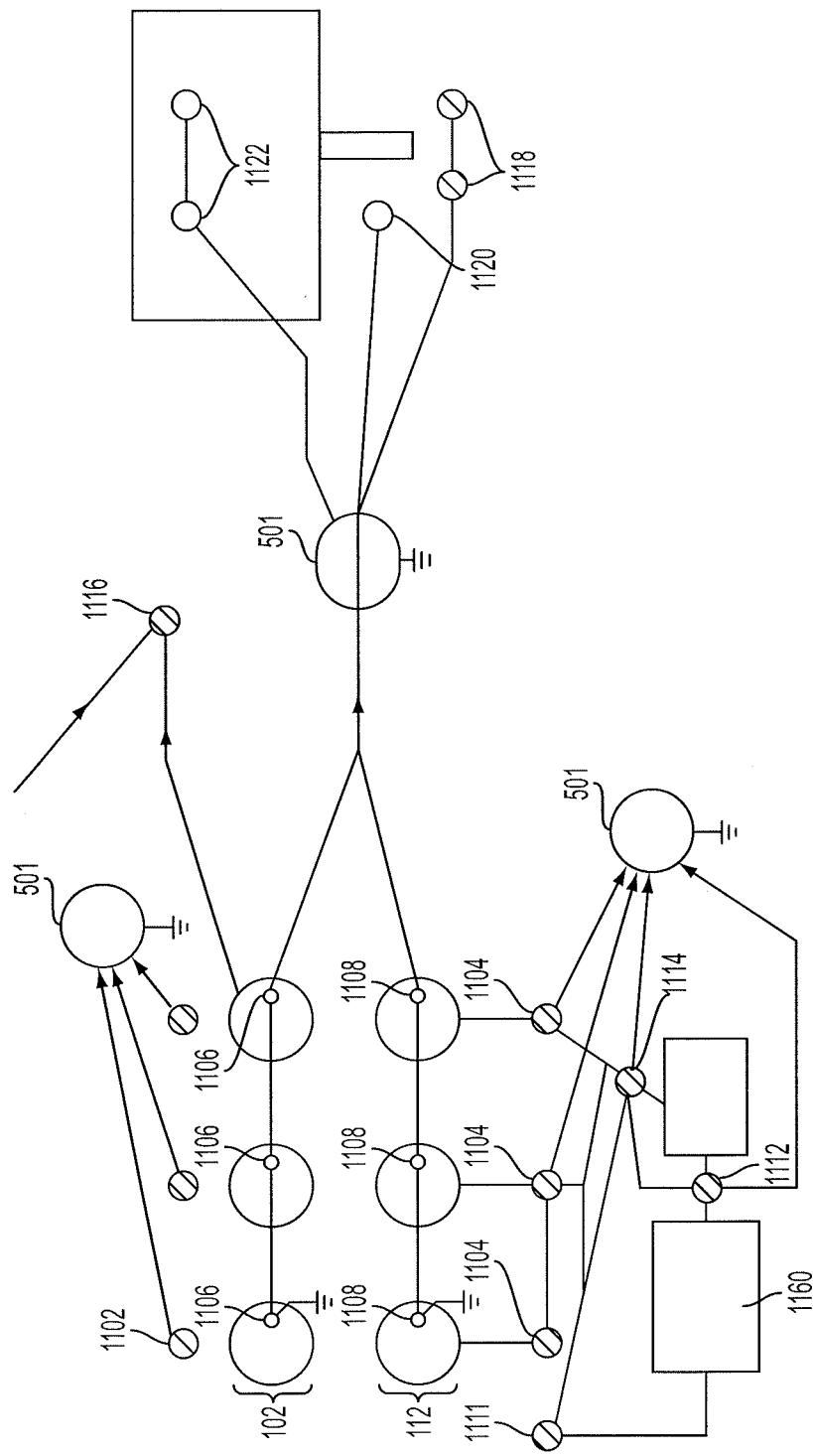
FIG. 11 is a schematic illustrating a feedback control system of a hydrogen fueled IC system, in accordance with various implementations.
Figure 12:
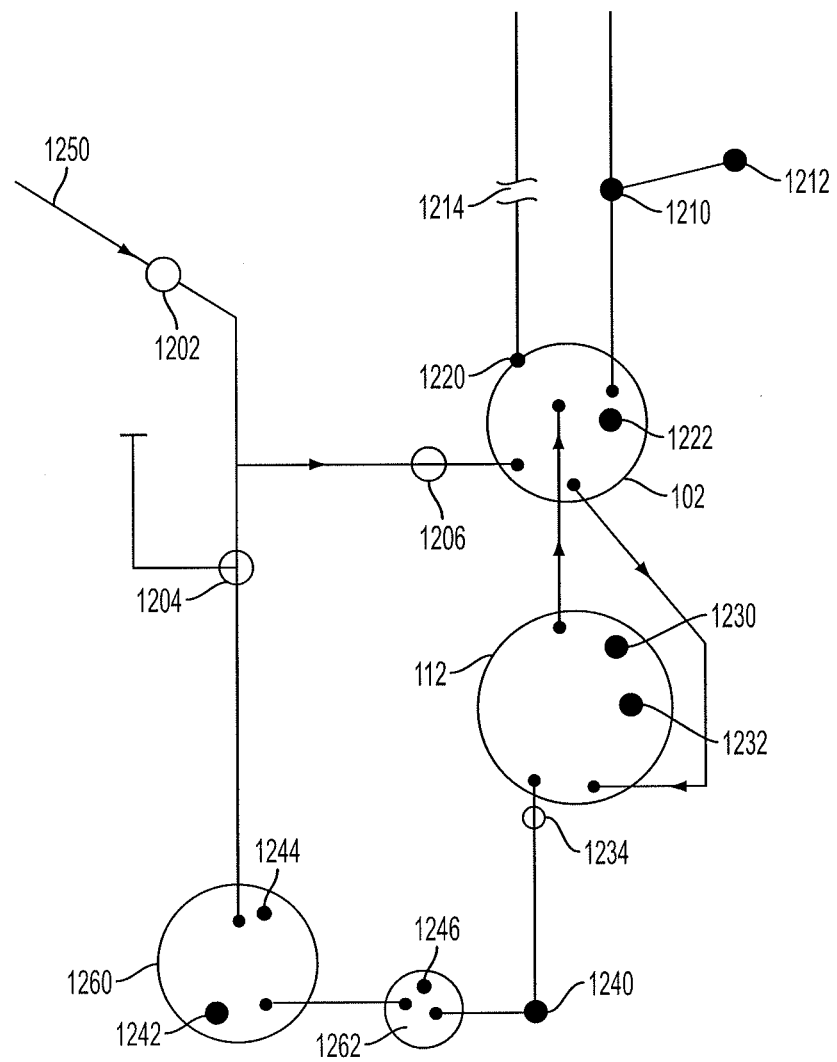
FIG. 12 is a schematic illustrating the fluid delivery and control system of a hydrogen fueled IC system, in accordance with various implementations.

Electrolysis cell 112 may comprise $H_2O$ filter outlet 338 operable to direct $H_2O$ out of electrolysis cell 112 to a filter (illustrated in FIGS. 11 and 12). $H_2O$ filter outlet 338 may include valve 120, operable to control flow of $H_2O$ into or out of electrolysis cell 112.

Figure 4:
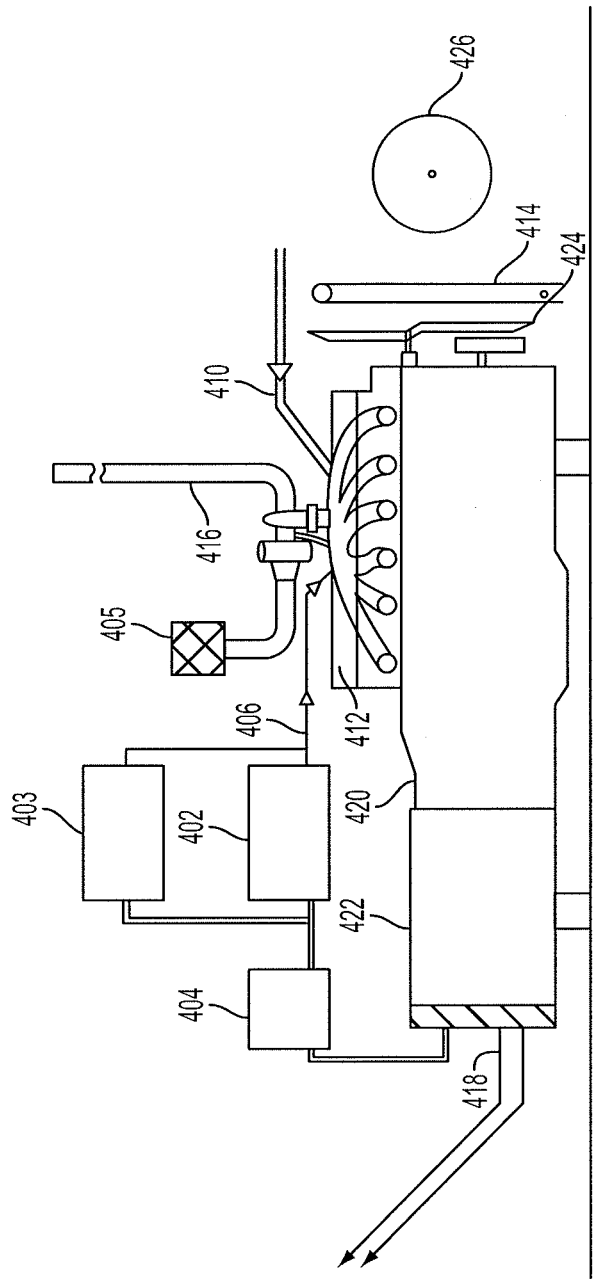
FIG. 4 is a schematic of a hydrogen fueled internal combustion (IC) system, in accordance with various implementations.

In accordance with various implementations, as illustrated in FIG. 4, a hydrogen fueled internal combustion (IC) system may be operable to convert one or more fuels into sellable power. The hydrogen fueled IC system may comprise IC engine 420 which burns various fuels to create usable mechanical power. The usable mechanical power may optionally be converted into electricity. The hydrogen fueled IC system may comprise a main module 402. Main module 402 may comprise electrolysis cells 112 and reservoirs 102 and is configured to generate hydrogen. The hydrogen fueled IC system may comprise a backup module 403. Backup module 403 may be configured to generate the hydrogen in the event of failure by main module 402. The hydrogen fueled IC system may comprise a power source 404. Power source 404 may be connected with main module 402 and configured to provide electricity to drive the electrolysis cycle in main module 402. Power source 404 may receive power input from an alternator 422. Alternator 422 may receive mechanical energy from IC engine 420 and serves to convert that energy into electrical energy. Alternator 422 may then communicate the electrical energy to one of at least power source 404 and sellable power outlet 418.

The hydrogen fueled IC system may further comprise an IC engine intake manifold 412. IC engine intake manifold 412 may be in communication with a first fuel line 410, a second fuel line 406, and an air supply 405. The hydrogen fueled IC system may comprise first fuel line 410. First fuel line 410 may provide any known or developed IC engine fuel to the IC engine intake manifold 412. For example, the first fuel line 410 may direct natural gas and/or liquid propane gas to the IC engine intake manifold 412.

The hydrogen fueled IC system may comprise second fuel line 406. Second fuel line 406 may provide a second fuel to IC engine intake manifold 412. In various examples, the second fuel may be a fuel produced in an electrolysis process. For example, the second fuel may be HHO. Second fuel line 406 may direct HHO from main module 402 to IC engine intake manifold 412.

The hydrogen fueled IC system may comprise air supply 405. Air supply 405 may provide outside air to IC engine intake manifold 412 through an air cleaner (illustrated in FIG. 17).

The hydrogen fueled IC system may further comprise an exhaust manifold 416. Exhaust manifold 416 may receive exhaust gases from the IC engine 420 and direct those gases to an exhaust gas energy recovery system (illustrated in FIGS. 6-9B).

The hydrogen fueled IC system may comprise radiator 414. A fan 424 may be connected to IC engine 420 and configured to blow air through radiator 414. A second fan 426 may be positioned on the side of the radiator 414 opposite fan 424 and configured to receive the moving air. This air may then turn second fan 426, which may provide electricity to electrolysis cell 112 using a second alternator (illustrated in FIG. 10).

Figure 5:
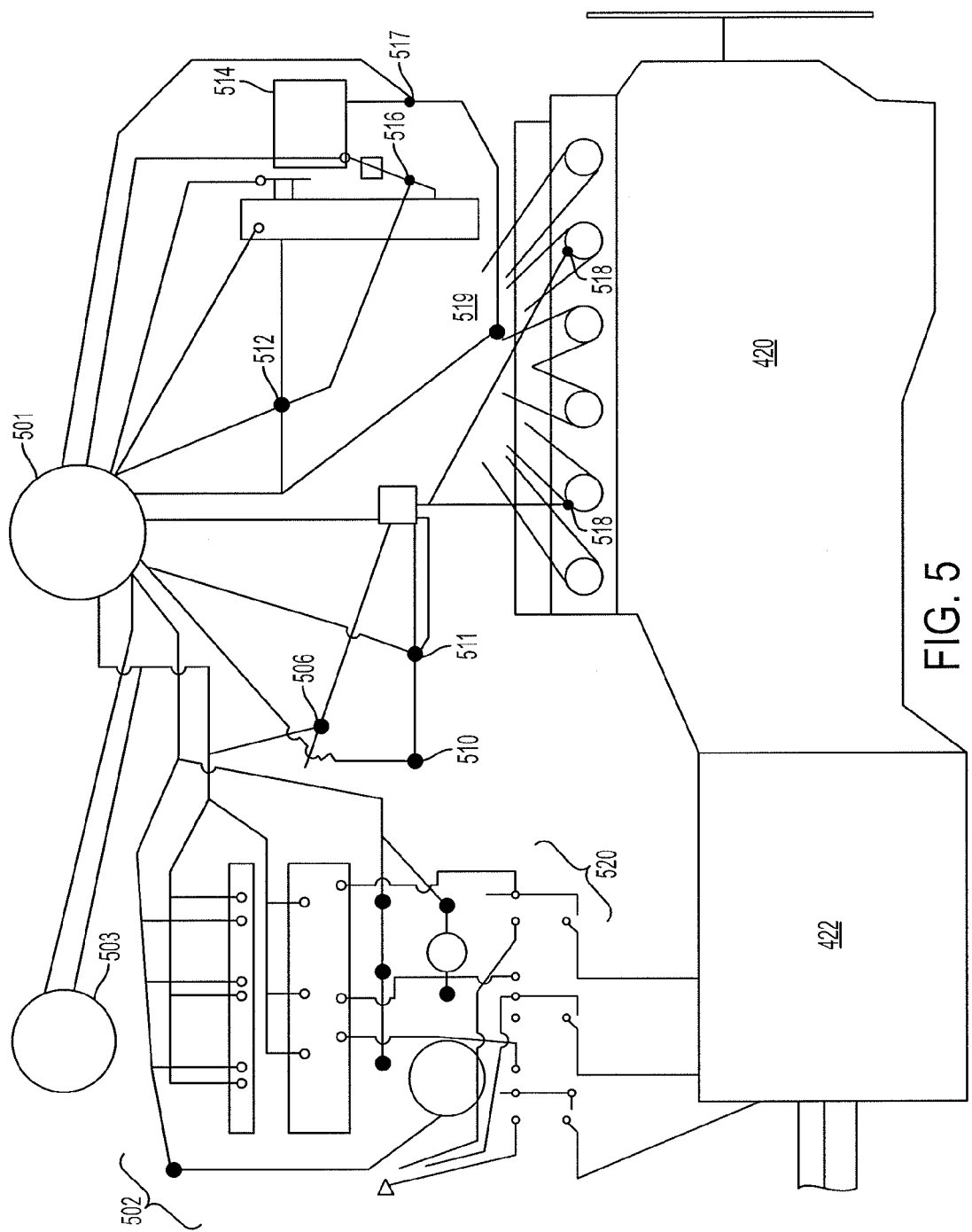
FIG. 5 is a schematic of a control system of a hydrogen fueled IC system, in accordance with various implementations.

In accordance with various implementations, as illustrated in FIG. 5, a hydrogen fueled IC generator system may comprise a control system. The control system may comprise a computer 501 (referred to herein as a computer and/or control panel). Computer 501 may be in communication with and control main module 502, which may correspond to main module 402. Main module 502 may comprise a hydrogen generation system including one or more electrolysis cells 112. Computer 501 may be in communication with and control back-up module 503, which may correspond to back up module 403. Computer 501 may be in communication with and control IC intake manifold 519, which may correspond to IC intake manifold 412. Computer 501 may be in communication with and control first fuel line 510, which may correspond to first fuel line 410. Computer 501 may be in communication with and control second fuel line 506, which may correspond to second fuel line 406. Computer 501 may be in communication with and control air intake 511, which may correspond to air supply 405. Computer 501 may be in communication with and control exhaust gas energy recovery system 514. Computer 501 may be in communication with and control sensors/controls 516, which may be related to the exhaust gas. Computer 501 may be in communication with and control sensors/controls 517, which may be related to fuel and air supply to the IC engine 420. Computer 501 may be in communication with and control sensors/controls 518, which may be engine sensors/controls.

Computer 501 may also be in communication with and control alternator switches 520 connecting alternator 422 to electrolysis cells 112. Computer 501 may be in communication with and control radiator water inlet 512, which may provide water for a radiator in the exhaust gas energy recovery system 514 (illustrated in FIGS. 6-9B). Computer 501 may be in communication with and control radiator water outlet 519, which may provide water for radiator 414.

Figure 6:
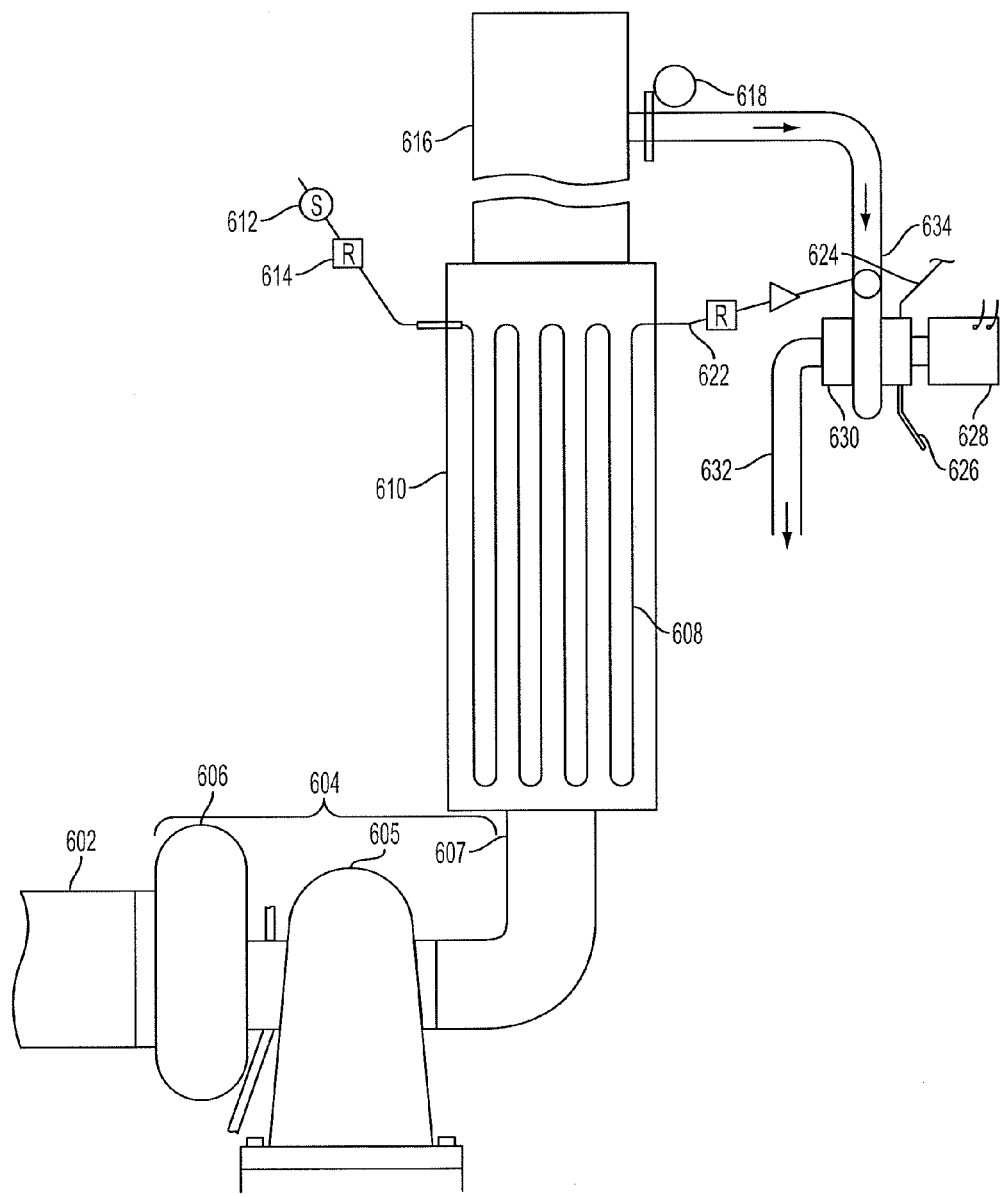
FIG. 6 is a schematic of an exhaust portion of a hydrogen fueled IC system, in accordance with various implementations.

In accordance with various implementations, as illustrated in FIG. 6, an exhaust portion of a hydrogen fueled IC system may comprise an exhaust gas energy recovery system. The exhaust gas energy recovery system may be operable to recover energy contained within the exhaust stream. The exhaust gas energy recovery system may comprise an air inlet 602. Air inlet 602 may draw in cold air from outside of the system. The exhaust gas energy recovery system may comprise engine turbo charger 604. Engine turbo charger 604 may further comprise air compressing unit 606, exhaust gas intake 605, and turbocharger exhaust gas outlet 607. Engine turbo charger 604 may function as a typical turbo charger by using exhaust gas from exhaust intake 605 to spin a turbine in air compressing unit 606 that compresses air coming into the air intake of IC engine 420. Exhaust gas leaves the engine turbo charger 604 from turbocharger exhaust gas outlet 607. In various examples, the engine turbocharger may operate on a maximum boost pressure of 5-10 psi.

The exhaust gas energy recovery system may comprise heat exchanger 610. For example, heat exchanger 610 may be a boiler. Heat exchanger 610 may have tubing 608 coiled through the exhaust gas path. In various examples tubing 608 may be stainless steel tubing. The heat exchanger 610 may receive hot exhaust gases from one of at least IC engine 420 and turbocharger gas outlet 607. The hot exhaust gases are routed through heat exchanger 610 allowing the heat to transfer from the exhaust gas to the exchanger fluid in tubing 608. Exhaust temperatures may range from 400 degrees to 1,100 degrees Fahrenheit. Exchanger fluid may be, for example, water, which becomes steam due to heat from the exhaust gas. Heat exchanger 610 may comprise heat exchanger fluid inlet 612 operable to direct exchanger fluid into tubing 608. Heat exchanger 610 may also comprise electric pressure regulator 614 configured to regulate the pressure of exchanger fluid being directed into tubing 608. Heat exchanger 610 may further comprise steam line 622 operable to direct steam produced in heat exchanger 610. Heat exchanger 610 may comprise pressure regulator 621 configured to regulate the pressure of steam passing through steam line 622.

The exhaust gas energy recovery system may comprise exhaust tubing 616. As the exhaust gases exit the heat exchanger 610, exhaust tubing 616 may direct the now cooler exhaust gas to gate valve 618. Gate valve 618 may be configured to open when the exhaust pressure or exhaust temperature reach a certain level. For example, gate valve 618 may be configured to open when the exhaust temperature reaches or exceeds 400° F. In response to the gate valve being opened, exhaust tubing 616 may direct the exhaust gas to a mixing chamber 634. Mixing chamber 634 may be configured to mix exhaust gas from exhaust tubing 616 and steam from the heat exchanger 610 supplied through steam line 622.

The exhaust gas energy recovery system may further comprise a turbine 630 that receives the exhaust gas/steam from mixing chamber 634. The exhaust gas energy recovery system may comprise a turbine steam exit 632. Turbine steam exit 632 may direct the exhaust gas/steam from turbine 630 back to the water/gas/steam intake in at least one of IC engine intake manifold 412 and electrolysis cell 112. Turbine 630 may turn alternator 628 converting kinetic energy from the exhaust gas into electricity. This electricity may be used by electrolysis cell 112. The turbine 630 and alternator 628 may comprise a turbine oil system having an oil delivery 624 and an oil return 626.

Figure 7:
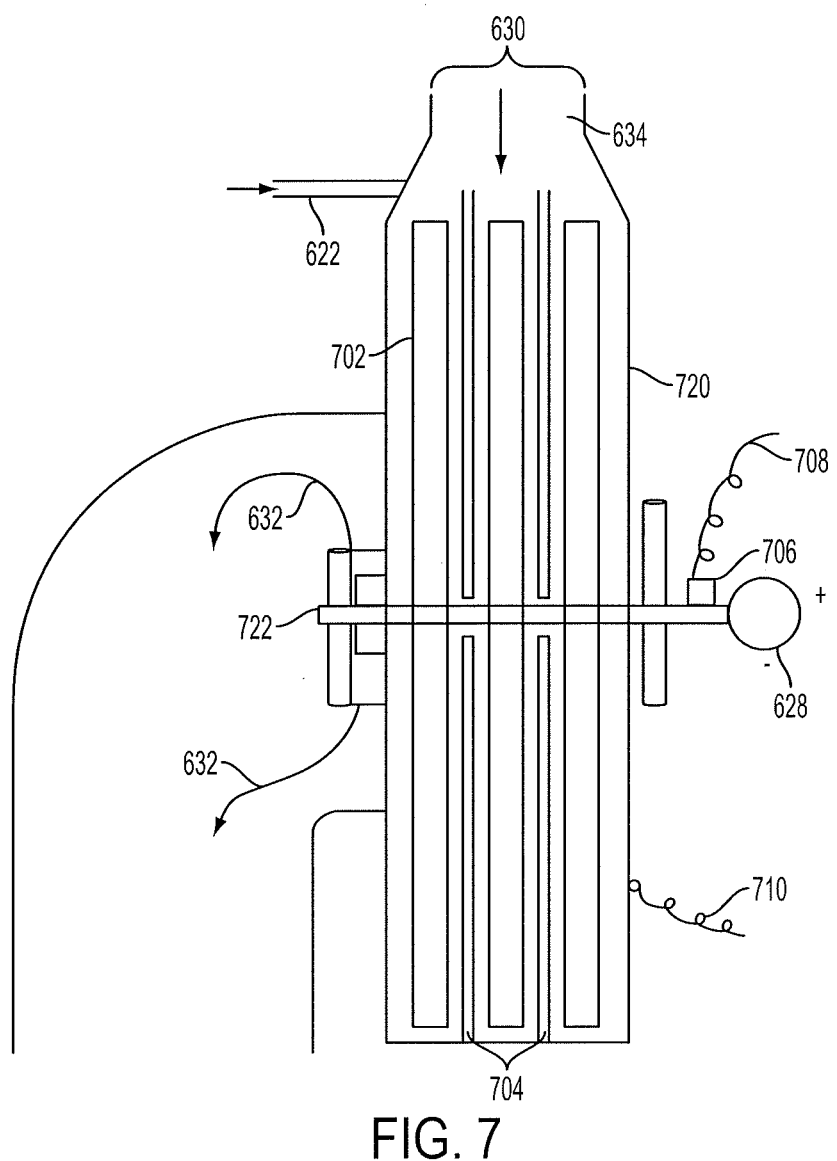
FIG. 7 is a schematic of an exhaust gas turbine, in accordance with various implementations.

In accordance with various implementations, as illustrated in FIG. 7, an exhaust gas turbine 630 may be operable to recover energy contained within the exhaust stream. Exhaust gas turbine 630 may be run from exhaust gases and H$_2$O in the form of steam. Exhaust gas turbine 630 may comprise a mixing chamber 634 which may be configured to mix exhaust gas from the IC engine 420 directed to the mixing chamber by exhaust tubing 616 and steam from the heat exchanger 610 supplied through steam line 622. Exhaust gas turbine 630 may comprise a turbine body 720. Exhaust gas turbine 630 may comprise one or more turbine discs 702 which spin around shaft 722. Discs 702 may include veins on the surface of the discs 702 configured to interfere with the flow of gases through the turbine 630, causing the discs 702 to spin (illustrated in FIG. 22). Exhaust gas turbine 630 may comprise partitions 704 which separate discs 702. Discs 702 are caused to spin by the exhaust gases, which subsequently spin shaft 722. Shaft 722 may in turn spin alternator 628, configured to convert the mechanical energy of spinning shaft 722 into electricity that may be provided to electrolysis cells 112. Alternator 628 may comprise an electric brush contact 706 having a positive voltage lead 708 and a negative voltage lead 710. Negative voltage lead 710 may be grounded to turbine body 720. The electric brush contact 706 may serve to conduct a current to spinning shaft 722. The exhaust gas turbine 630 may comprise a turbine steam exit 632 as discussed above.

Figures 8A, 8B:
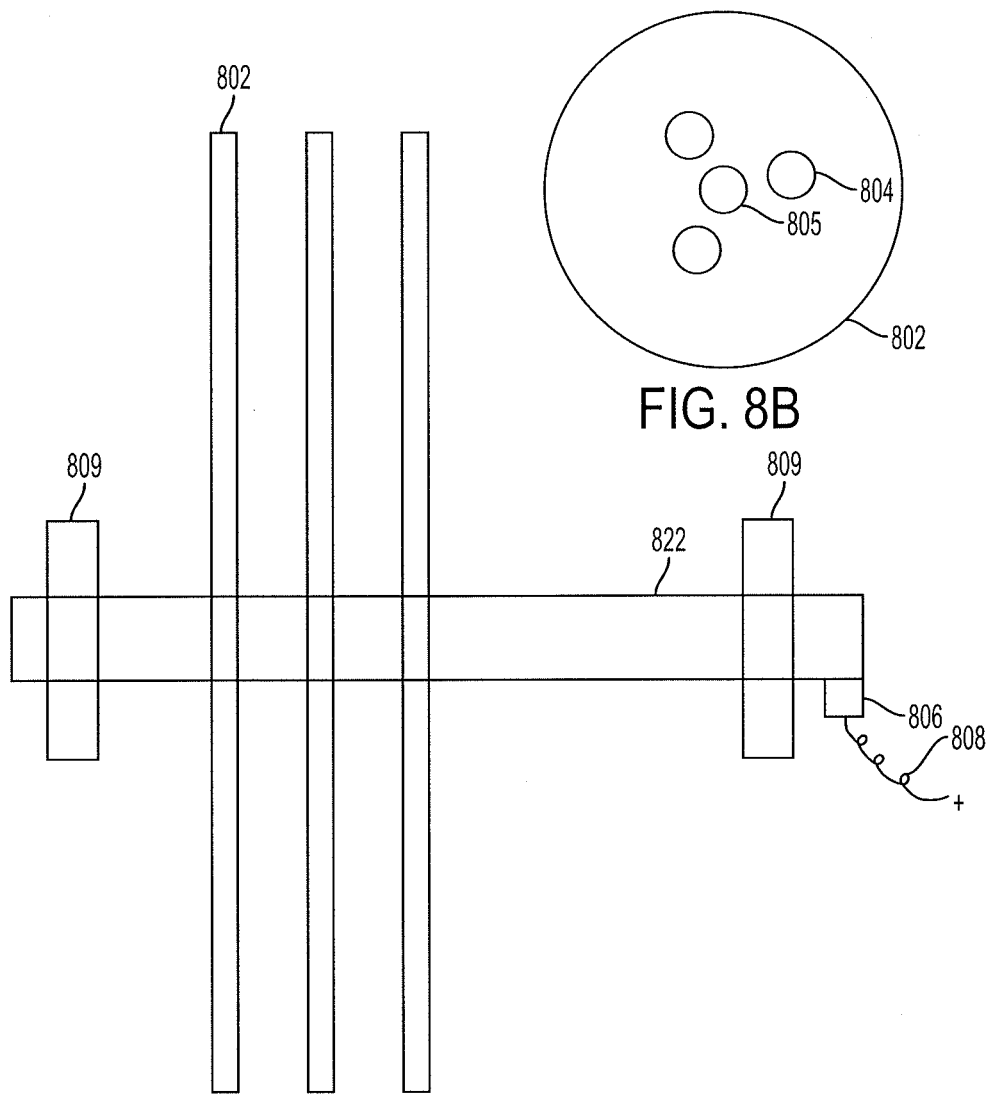
FIG. 8A is a schematic illustrating the components of an exhaust gas turbine, in accordance with various implementations.
FIG. 8B is a schematic illustrating a turbine disc, in accordance with various implementations.

In accordance with various implementations, as illustrated in further detail in FIGS. 8A and 8B, an exhaust gas turbine 630 may comprise one or more turbine discs 802, which may correspond to discs 702. Turbine discs 802 may be configured to spin around shaft 822, which may correspond to shaft 722. Turbine discs 802 may include a plurality of holes 804. In various examples the holes 804 may be located around the axis of the discs 802. Turbine disc 802 may also include a center hole 805 coaxial with the disc 802 configured to fix the disc 802 to shaft 822. In various examples, the exhaust gas turbine 630 may comprise three discs 802 located coaxial with shaft 822. Exhaust gas turbine 630 may comprise an electric brush contact 806, which may correspond to electric brush contact 706, having a positive voltage lead 808, which may correspond to positive voltage lead 708. Exhaust gas turbine 630 may further comprise bearings 809 to support shaft 822.

In accordance with various implementations, as illustrated in FIGS. 9A and 9B, the exhaust gas turbine may further comprise isolation point 909 and thrust washer 908. Turbine housing 920, which may correspond to turbine housing 720, may be in the shape of a centrifugal fan with the internal discs 902, which may correspond to discs 702, located about the axis of the large round body portion of the turbine housing 920. Shaft 922, which may correspond to shaft 722, may pass through the center holes of the internal discs 902 and turbine housing 920. Shaft 922 may further be supported by bearings 906, which may correspond to bearings 806. Isolation point 909 and thrust washer 908 may be configured to isolate the interior of the turbine housing 920, thereby retaining exhaust gases and steam within the turbine housing 920.

Figure 10:
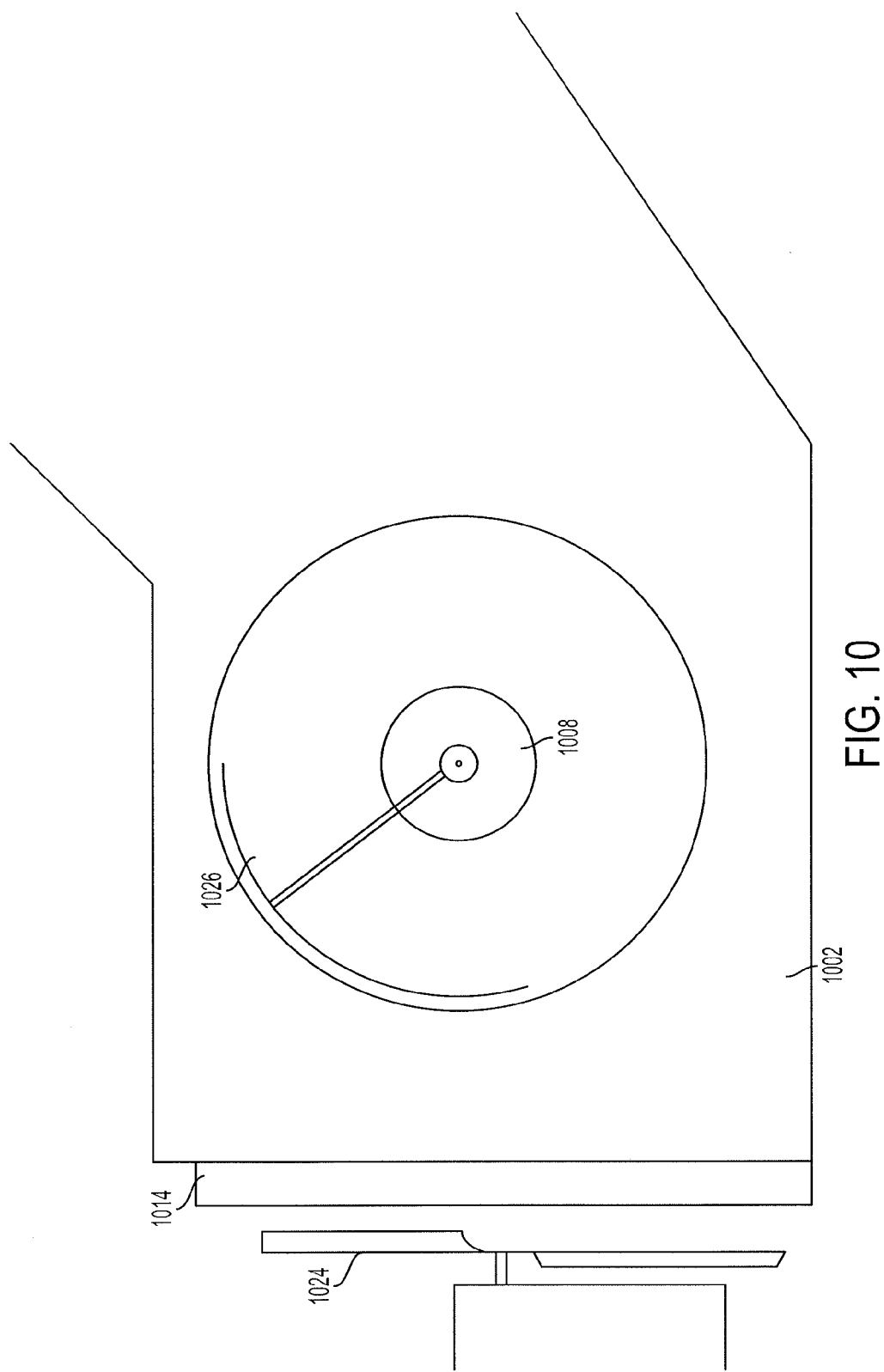
FIG. 10 is a schematic illustrating a heat exchange portion of a hydrogen fueled IC system, in accordance with various implementations.

In accordance with various implementations, as illustrated in FIG. 10, a heat exchanger portion of a hydrogen fueled IC system may be operable to recover energy contained within the IC engine cooling system. For example, the IC cooling system may comprise a heat exchanger element (e.g., radiator) 1014, which may correspond to radiator 414. The IC cooling system may comprise fan 1024, which may correspond to fan 424. The IC cooling system may further comprise centrifugal fan 1026, which may correspond to second fan 426. The IC cooling system may comprise ducting 1002. The IC cooling system may comprise an A.C. alternator 1008 connected to centrifugal fan 1026. After air is pushed through radiator 1014 by fan 1024, the air is forced into the centrifugal fan 1026. The air movement into centrifugal fan 1026 causes centrifugal fan 1026 to turn. The shaft that supports the wheel within centrifugal fan 1026 causes the shaft of A.C. alternator 1008 to turn. A.C. alternator 1008 converts this mechanical energy into electricity that is supplied back to electrolysis cell 112. In various examples, centrifugal fan 1026 may be a squirrel cage fan within ducting 1002, which surrounds the entire radiator 1014.

In accordance with various implementations, as illustrated in FIG. 11, the hydrogen fueled IC system may comprise a control system configured to operate the hydrogen fueled IC system. The hydrogen fueled IC system may comprise at least one of reservoir solenoids 1102, cell solenoids 1104, exhaust gas recirculation (EGR) solenoids 1118, reservoir pressure sensors 1106, electrolysis cell temperature sensors 1108, engine temperature sensors 1122, EGR temperature sensors 1120, tank solenoid 1111, filter inlet solenoid 1112, filter outlet solenoid 1114, second fuel solenoid 1116 and a control panel 501. The control panel 501 may be operable to control each of the sensors and/or actuators. The sensors may be configured to sense pressures, levels, and temperatures. The solenoids may act as valves to control the flow of fluids and liquids within the hydrogen fueled IC system. The control panel 501 may be in communication with at least one of the sensors and actuators to receive information and activate the actuators to enable operation of the hydrogen fueled IC system.

In accordance with various implementations, as illustrated in FIG. 12, the hydrogen fueled IC system may comprise a fluid delivery and control system. The fluid delivery and control system may obtain water through water supply 1250. For example, this may be city water. The flow of the water into the system may be controlled by valve 1202 (e.g., electric solenoid). The water may then enter the system as shown by the arrows illustrated in FIG. 12. In various examples, water may also or alternatively be supplied from tank 1260. Water supplied from tank 1260 may be controlled by valve 1204. Water from both supply 1250 and tank 1260 may be controlled by inlet valve 1206. After inlet valve 1206, reservoir 102 may receive the water. Tank 1260 may comprise sensor 1244 and sensor 1242, which may be at least one of a pressure and temperature sensor. Tank 1260 may receive water from filter 1262. Filter 1262 may comprise sensor 1246, which may be at least one of a pressure and temperature sensor. Filter 1262 may receive water from electrolysis cell 112 through valve 1234 (e.g., electric solenoid). Water from electrolysis cell 112 to filter 1262 may also flow through sensor 1240, which may be at least one of a pressure and temperature sensor. Electrolysis cell 112 may comprise sensors 1230 and 1232, each of which may be at least one of a pressure and temperature sensor. Electrolysis cell 112 may direct HHO to reservoir 102. Reservoir 102 may direct water back to cell 112. Reservoir may comprise sensors 1220 and 1222, each of which may be at least one of a pressure and fluid level sensor. Reservoir 102 may direct HHO and/or steam to an atmospheric vent as controlled by a mechanical overpressure safety device 1214 (e.g., a pressure relief valve). Reservoir 102 may direct HHO to engine 420. Engine 420 may comprise sensors 1210 and 1212, each of which may be at least one of a pressure and temperature sensor. Each of the sensors and valves may be individually controlled or collectively controlled by control panel 501.

Figure 13:
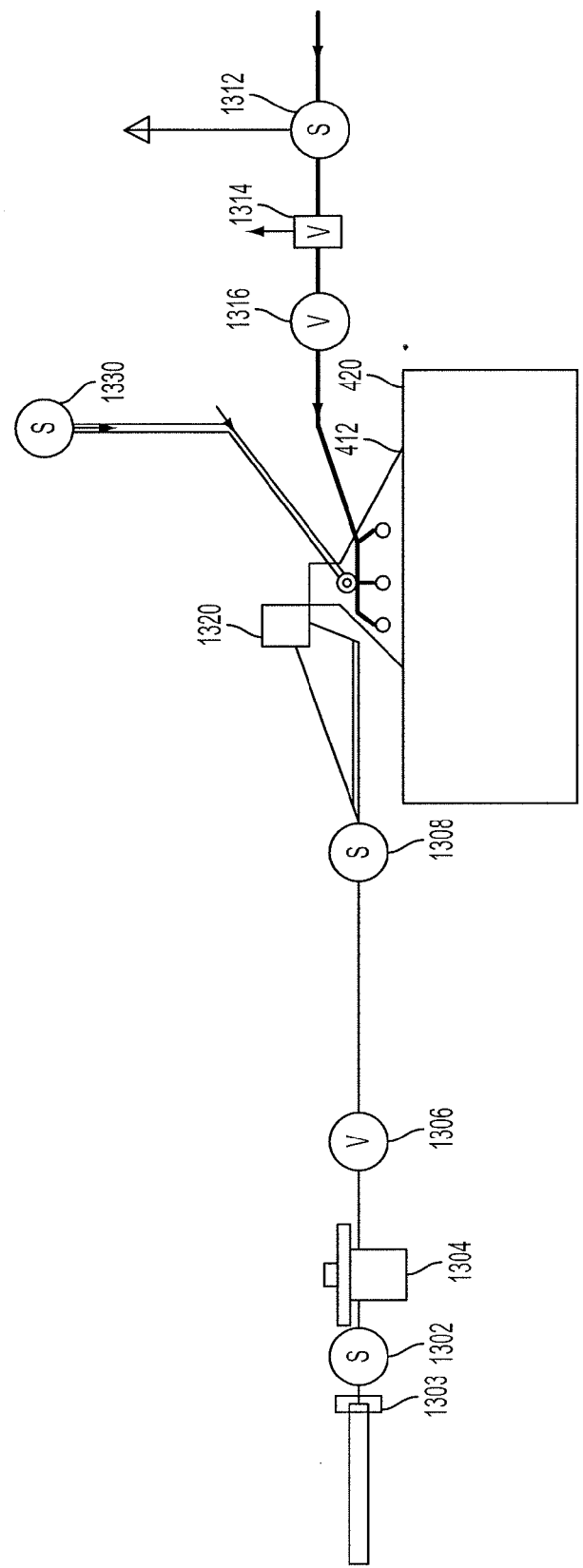
FIG. 13 is a schematic illustrating the fuel system components of a hydrogen fueled IC system, in accordance with various implementations.

In accordance with various implementations, as illustrated in FIG. 13, the hydrogen fueled IC system may comprise a fuel delivery and control system. The fuel delivery system may comprise an IC intake manifold 412. IC intake manifold 412 may comprise an air inlet 1320. In various examples, air inlet 1320 may be a venturi inlet. IC intake manifold 412 may comprise a first fuel source (e.g., natural gas and/or liquid petroleum). IC intake manifold 412 may further comprise a second fuel source (e.g., HHO). The line supplying the first fuel source to the IC intake manifold 412 may comprise at least one of a utility meter 1303, a main shut-off valve 1302, a high pressure regulator 1304, a manual valve 1306, and a limiting valve 1308. The limiting valve 1308 may be configured to operate at one or more fuel flow rates. A first fuel flow rate may be 100% capacity. A second fuel flow rate may be 20% capacity. The first fuel flow may be operable at startup. For example, startup may be the first 5-20 minutes the IC engine operates. The second fuel flow may be any time after startup. The transition between fuel flow rates may be controlled by the control panel 501. The transition may occur in response to a preset time. The transition may occur in response to a preset level of HHO being reached in reservoir 102. The line supplying the second fuel source to the IC intake manifold 412 may comprise at least one of an atmosphere release valve 1312, a mechanical over pressure valve 1314, and a one way valve 1316. The one way valve 1316 may prevent back fire to electrolysis cell 112 and/or reservoir 102. IC intake manifold 412 may comprise an EGR inlet. EGR gases may be controlled and directed into the IC intake manifold 412 by valve 1330. Valve 1330 may be a gate valve. In various examples of the fuel delivery and control system, all electronically controlled fuel valves may be closed in response to the engine not running.

Figure 14:
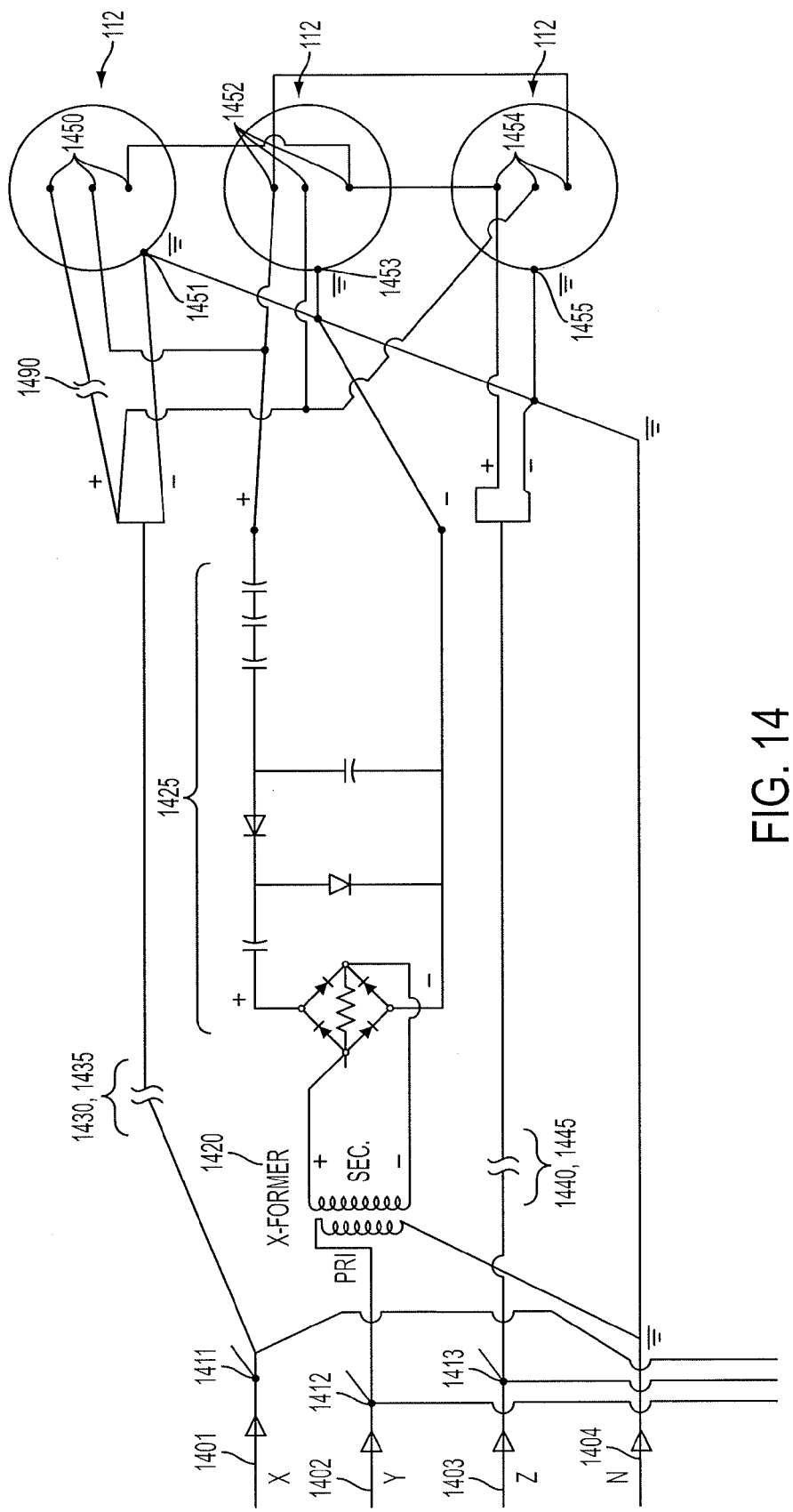
FIG. 14 is a schematic illustrating power input to electrolysis cells, in accordance with various implementations.

In accordance with various implementations, as illustrated in FIG. 14, the hydrogen fueled IC generator system may comprise a circuit operable to control input to electrolysis cells 112. The circuit may comprise of alternating current (AC) provided to electrolysis cells 112 by alternator 422. In one embodiment, the AC may have three phases: an x-phase 1401, a y-phase 1402, and a z-phase 1403. A neutral line 1404 may also be connected to the electrolysis cells 112 to serve as a ground. The x-phase AC 1401 may be controlled by switch 1411. The y-phase AC 1402 may be controlled by switch 1412. The z-phase AC 1403 may be controlled by switch 1413. These switches may be controlled by control panel 501.

Electrolysis cells 112 may operate on a direct current (DC). Each AC phase may be rectified to provide a DC to electrolysis cells 112. In one embodiment, y-phase AC 1402 may be rectified using y-phase transformer 1420 and y-phase full wave rectifier circuit 1425. Similarly, x-phase AC 1401 may be rectified using x-phase transformer 1430 and x-phase full wave rectifier circuit 1435, and z-phase AC 1403 may be rectified using z-phase transformer 1440 and z-phase full wave rectifier circuit 1445 (not shown in FIG. 14 but identical to y-phase counterparts). After rectification, at least one of each phase DC may be provided to electrolysis cells 112 through anodes 1450, 1452, 1454 and cathodes 1451, 1453, 1455. The circuit may further comprise switch 1490 operable to open the circuit. Switch 1490 may be controlled by control panel 501.

Figure 15:
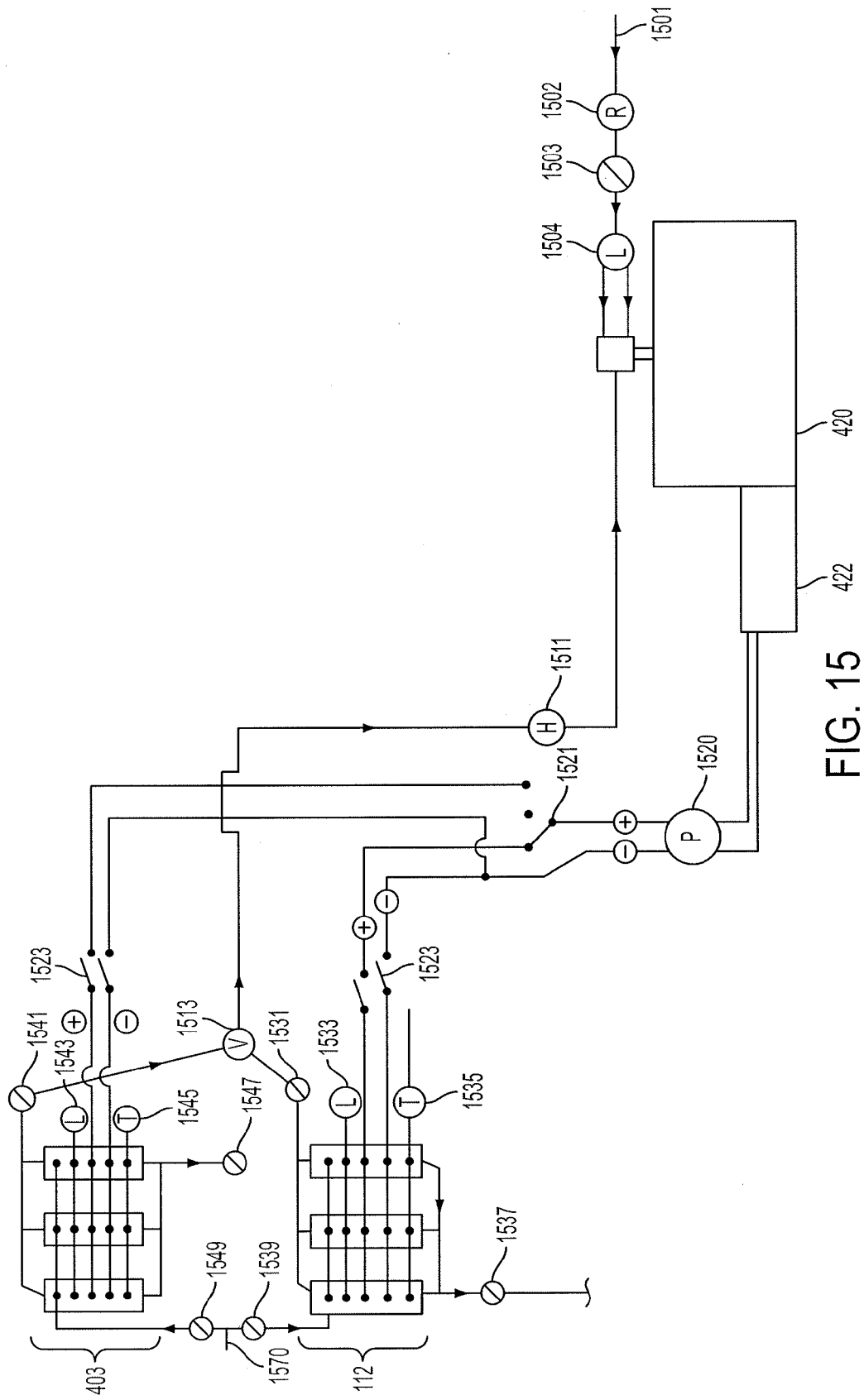
FIG. 15 illustrates electrical connections between an engine, alternator, and hydrogen cells, in accordance with various implementations.

In accordance with various implementations, FIG. 15 depicts electrical connections between IC engine 420, alternator 422, and electrolysis cells 112. Alternator 422 may produce electric power to provide to power source 1520. Power source 1520 may provide a current to electrolysis cells 112. The electrical connections may comprise switches 1523 operable to control the current to electrolysis cells 112 from power source 1520. Electrolysis cells 112 may comprise electrical connections to fluid level sensors 1533 and temperature sensors 1535. Electrical connections may further comprise connections to HHO outlet valve 1531, $H_2O$ inlet valve 1539, and flush valve 1537. HHO outlet valve 1531 may be configured to control HHO output from electrolysis cells 112 to hydrogen fuel line 1511. $H_2O$ inlet valve 1539 may be configured to control $H_2O$ input into electrolysis cells 112 from water source 1570 (e.g., city water source). Flush valve 1537 may be configured to control flushing of $H_2O$ out of electrolysis cells 112.

Electrical connections may comprise roll-over switch 1521 operable to switch current from power source 1520 away from electrolysis cells 112 towards backup module 403. Backup module 403 may include backup cells and backup switches 1523 configured to control the current to backup module 403. Backup module 403 may further comprise electrical connections to backup fluid level sensors 1543 and backup temperature sensors 1545. Electrical connections may further comprise connections to backup HHO outlet valve 1541, backup $H_2O$ inlet valve 1549, and backup flush valve 1547, all operable similarly to the primary electrolysis cell 112 counterparts.

The electrical connections, illustrated in FIG. 15, may further comprise HHO switch 1513 configured to switch between electrolysis cells 112 and backup module 403 outputting to hydrogen fuel line 1511. Hydrogen fuel line 1511 may supply hydrogen fuel to IC engine 420.

The electrical connections may comprise gas regulator 1502, valve 1503, and fluid sensor 1504 in a first fuel line that directs a first fuel to IC engine 420. The first fuel may be, for example, natural gas or liquid propane. Gas regulator 1502 may be configured to regulate the amount of first fuel sent to IC engine 420. Valve 1503 may be operable to control whether the first fuel enters IC engine 420. In one embodiment, valve 1503 may be an electric solenoid. Fluid sensor 1504 may be configured to sense the amount of first fuel entering IC engine 420. All regulators, sensors, valves, and switches may be controlled by control panel 501.

Figure 16:
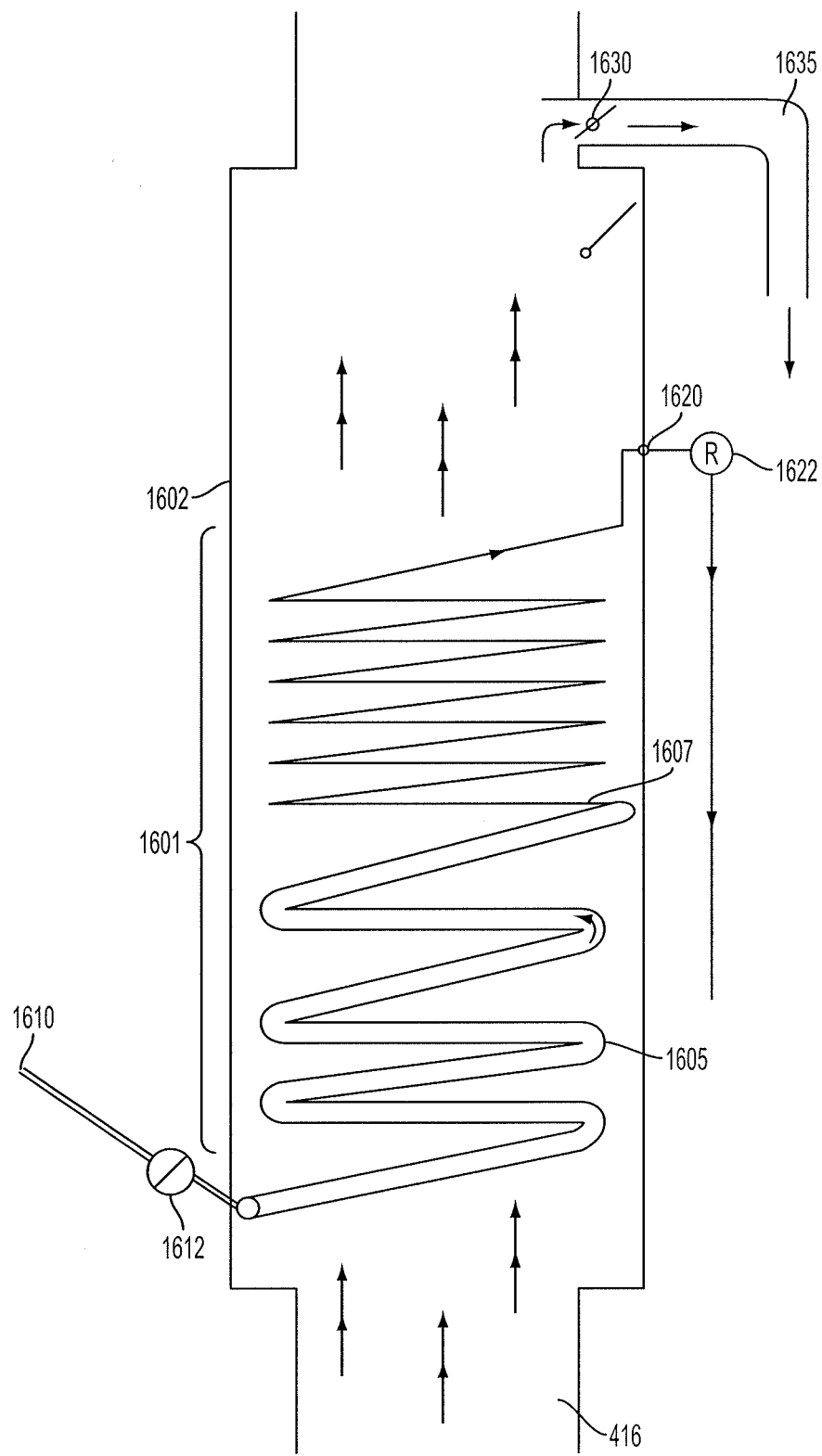
FIG. 16 illustrates an exhaust gas boiler, in accordance with various implementations.

In accordance with various implementations, FIG. 16 illustrates an exhaust gas boiler 1601 built into muffler 1602. Exhaust gas boiler 1601 may receive hot exhaust gas from exhaust manifold 416 in order to heat an exchanger fluid. Exchanger fluid may, for example, be water. Exhaust gas boiler 1601 may comprise tubing 1605 operable to receive the exchanger fluid. In various examples, tubing 1605 may be stainless steel tubing. Tubing 1605 may become narrower tubing 1607 within exhaust gas boiler 1601. For example, tubing 1605 may have a ⅜ inch diameter and narrower tubing 1607 may have a ¼ inch diameter. Exchanger fluid in tubing 1605 and narrower tubing 1607 may be heated by hot exhaust gas into steam. Exhaust gas boiler 1601 further comprises valve 1612 configured to control exchanger fluid into tubing 1605 from source 1610, which may be, for example, city water. Exhaust gas boiler 1601 comprises steam outlet 1620 operable to output steam from narrower tubing 1607. Steam outlet 1620 may include gas regulator 1622 configured to regulate the steam output from exhaust gas boiler 1601.

Exhaust gas boiler 1601 comprises valve 1630 operable to control exhaust gases exiting exhaust gas boiler 1601 to exhaust tubing 1635. Valve 1630 may, for example, be a butterfly valve.

Figure 17:
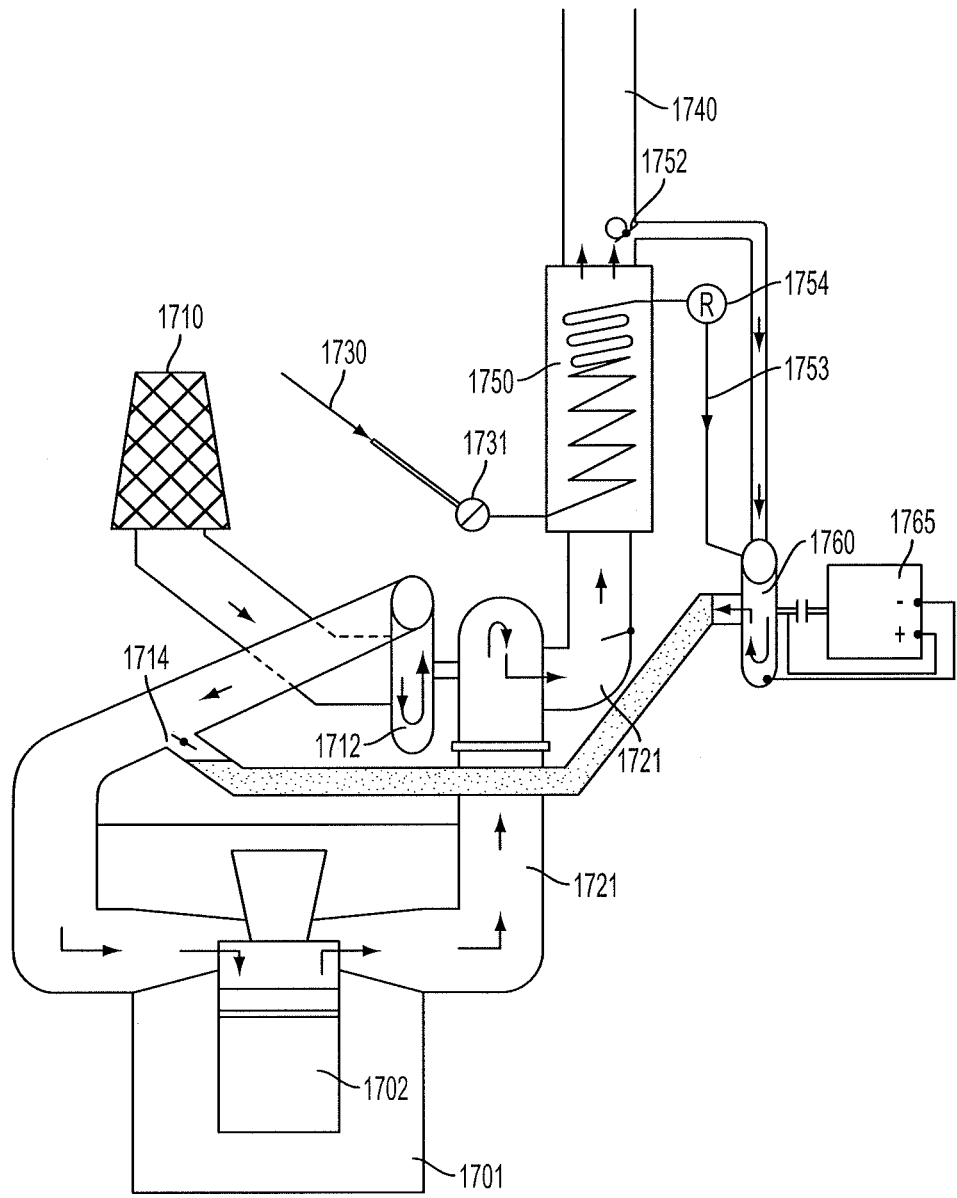
FIG. 17 illustrates connections between the engine, boiler, and alternator, in accordance with various implementations.

In accordance with various implementations, FIG. 17 illustrates the connections between the engine, boiler, and alternator. The piston 1702 in engine block 1701 may cause exhaust gas flow 1721 to exhaust gas boiler built into muffler 1750. Exhaust gas may continue into exhaust pipe 1740 and through valve 1752 (e.g., butterfly valve) to turbine 1760. Turbine 1760 may also receive steam flow 1753 from exhaust gas boiler 1750 through gas pressure regulator 1754. The steam is created from water from water source 1730 flowing through valve 1731 and heated in exhaust gas boiler 1750. The turbine 1760 may rotate due to steam and exhaust gas to operate alternator 1765. Exhaust gas and steam may exit turbine 1760 and pass through valve 1714 (e.g., butterfly valve). After passing through valve 1714, exhaust gas and steam may mix with air from air cleaner 1710 having been compressed by engine turbocharger 1712. The mixture of exhaust gas, steam, and compressed air may then be directed to piston 1702 in engine block 1701.

Figure 18:
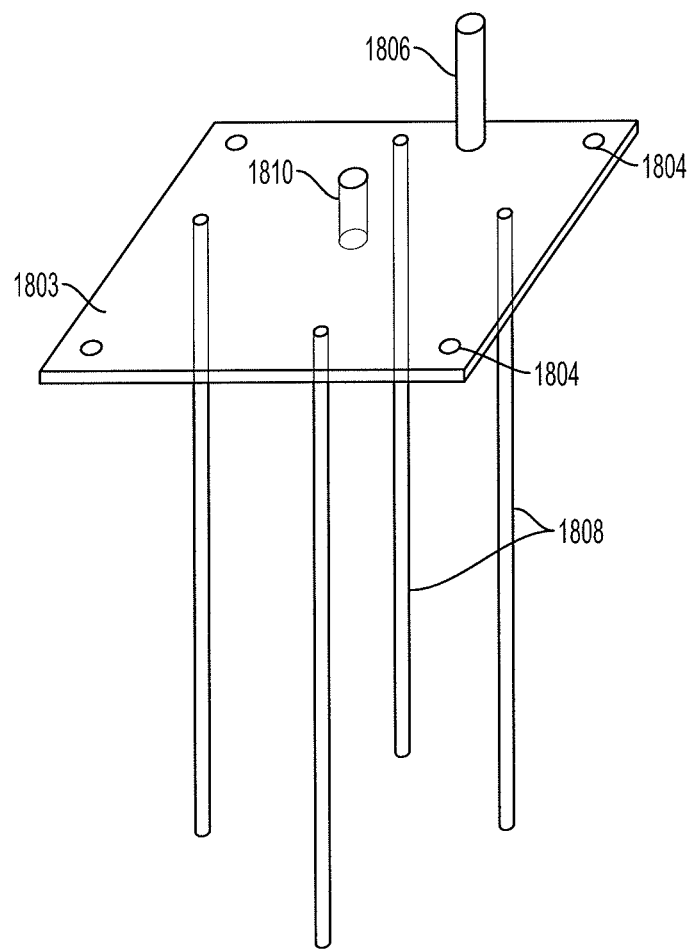
FIG. 18 illustrates an upper portion of a hydrogen cell, in accordance with various implementations.

In accordance with various implementations, FIG. 18 illustrates an upper portion of a hydrogen cell. Upper portion of hydrogen cell may comprise top plate 1803, HHO outlet 1810, and anode elements 1808. HHO outlet 1810 may be configured to output HHO from hydrogen cell 112. Anode elements 1808 may be in conductive communication with top plate 1803 and positive electrical connection 1806. Anode elements 1808 may extend from top plate 1803 to provide electrical connections for electrolysis. Anode elements 1808 may, for example, be long stainless steel cylindrical rods with a ¼ inch diameter. Top plate 1803 may comprise holes 1804 located in the corners of top plate 1803. The holes 1804 may be configured to receive bolts from a lower portion of the hydrogen cell.

Figure 19:
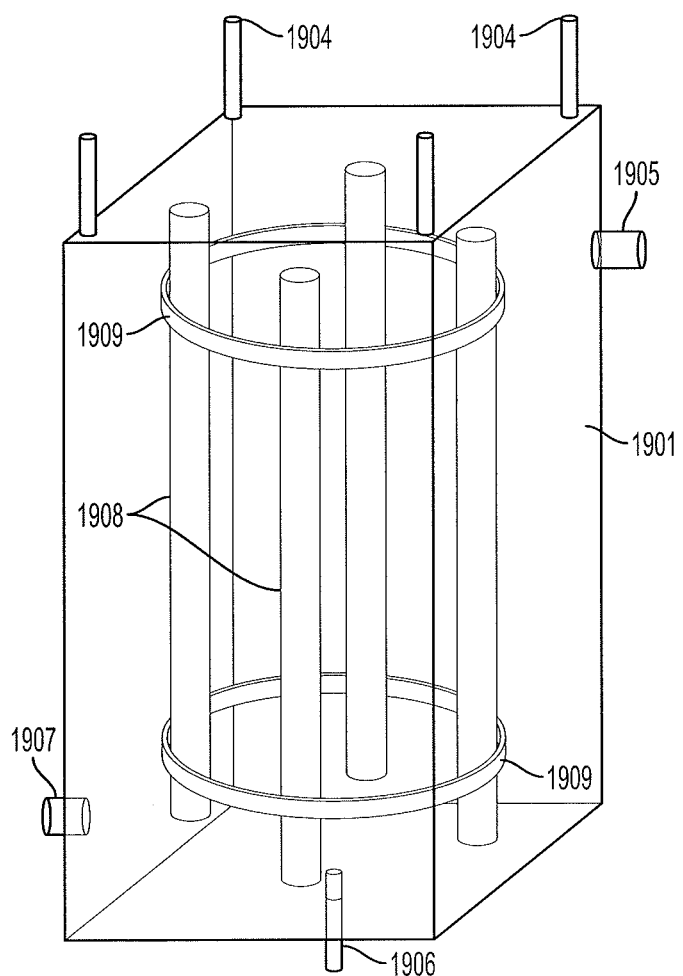
FIG. 19 illustrates a lower portion of the hydrogen cell, in accordance with various implementations.

In accordance with various implementations, FIG. 19 illustrates a lower portion of the hydrogen cell. The lower portion of the hydrogen cell may comprise a container 1901. The container 1901 may be, for example, a prism with stainless steel sides ⅛ of an inch thick and containing water. Container 1901 may comprise cathode element tubes 1908 configured to receive anode element rods 1808 when the upper portion of the hydrogen cell is installed into the lower portion of the hydrogen cell. Container 1901 may further comprise rings 1909 configured to retain cathode element tubes 1908 within container 1901. Cathode element tubes 1908 and rings 1909 may be in conductive communication with container 1901. Container 1901 may comprise $H_2O$ inlet 1907 and $H_2O$ filter outlet 1906. $H_2O$ inlet 1907 may be configured to receive $H_2O$ from reservoir 102. $H_2O$ filter outlet 1906 may be configured to output $H_2O$. Container 1901 may further comprise negative electric connection 1905. Container may comprise bolts 1904 configured to fit into holes 1804 of top plate 1803 when upper portion of the hydrogen cell is installed into lower portion of the hydrogen cell.

Figure 20:
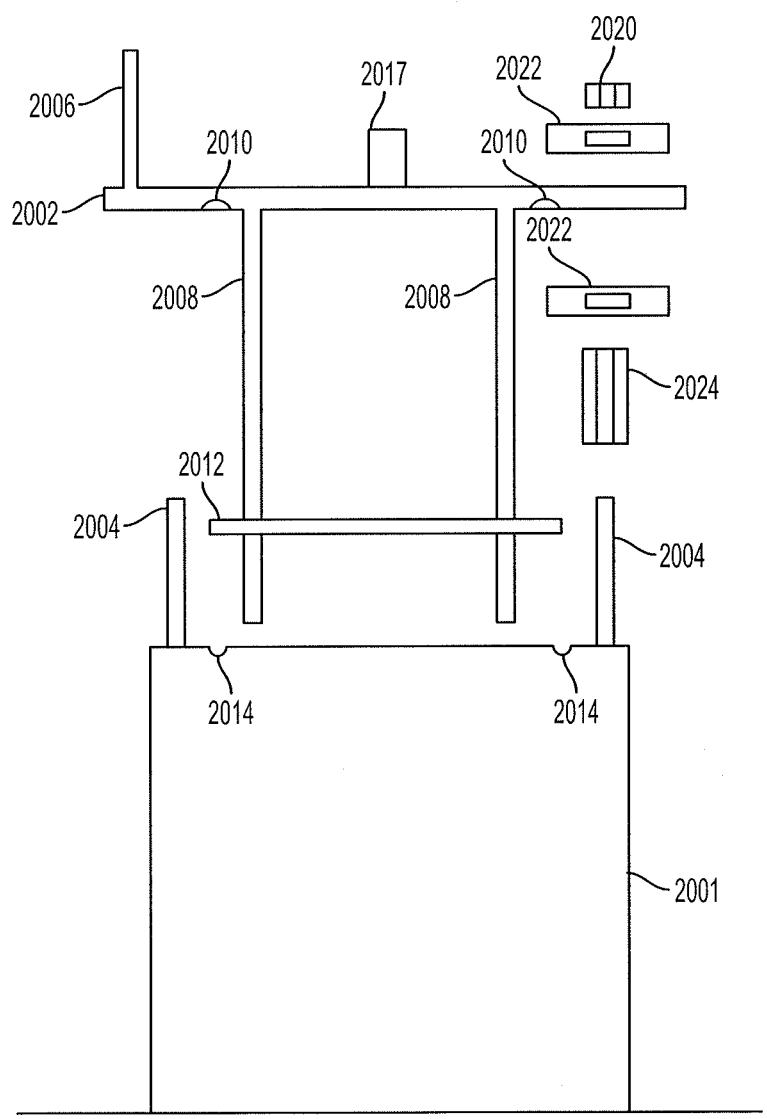
FIG. 20 illustrates an exploded view of the hydrogen cell, in accordance with various implementations.

In accordance with various implementations, FIG. 20 depicts an exploded view of the hydrogen cell. The hydrogen cell may comprise top plate 2002. Top plate 2002 may comprise electrical connection 2006, HHO outlet 2017, and upper grooves 2010. The hydrogen cell may further comprise anode element rods 2008 extending from top plate 2002. Hydrogen cell may comprise container 2001. Container 2001 may comprise lower grooves 2014 and bolts 2004 extending from the corners of container 2001. Hydrogen cell may further comprise O-ring 2012 configured to fit into upper grooves 2010 and lower grooves 2014 and operable to insulate top plate 2002 from container 2001. O-ring may be a non-conductive material such as, for example, rubber. Hydrogen cell may comprise nuts 2020 configured to secure container 2001 to top plate 2002 using bolts 2004. Hydrogen cell may further comprise non-conductive washers 2022 and non-conductive sleeve 2024. Non-conductive washers 2022 may be configured to insulate top plate 2002 from nuts 2020 and bolts 2004. Non-conductive sleeve 2004 may be configured to cover bolts 2004 with insulation. The insulation provided by O-ring 2012, non-conductive washers 2022 and non-conductive sleeve 2004 allow the hydrogen cell to be sealed without affecting electrolysis within.

Figure 21:
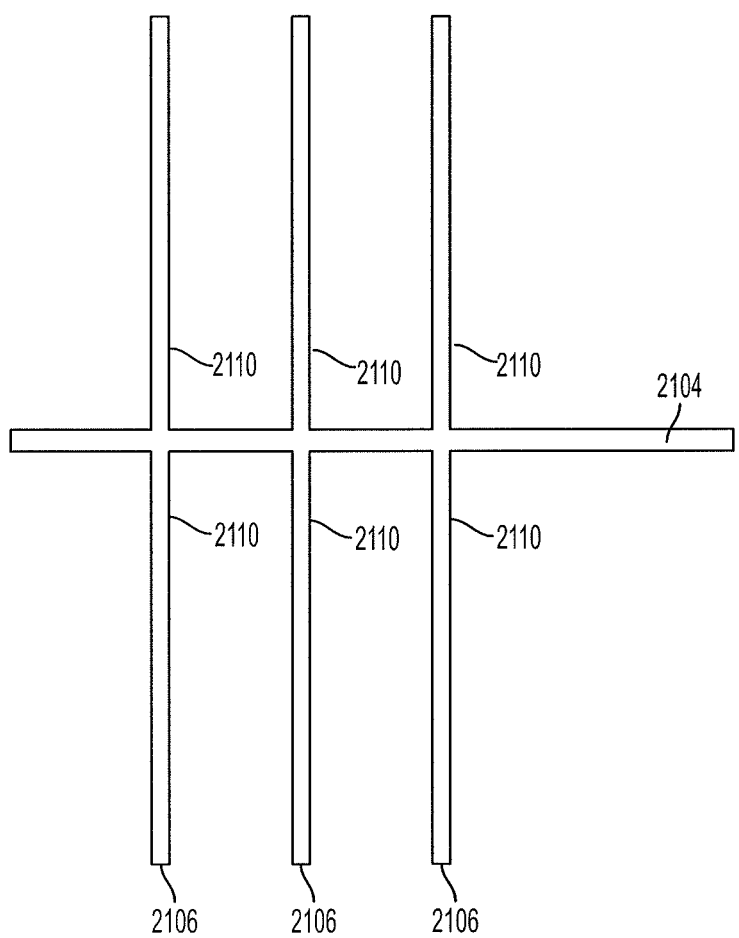
FIG. 21 illustrates a main shaft of an exhaust and steam turbine, in accordance with various implementations.

In accordance with various implementations, FIG. 21 depicts a main shaft 2104 of an exhaust and steam turbine. Main shaft 2104 may be a center axis for a plurality of coaxial discs 2106. The coaxial discs 2106 may include a plurality of holes 2110 arranged near the center of the discs 2106.

Figure 22:
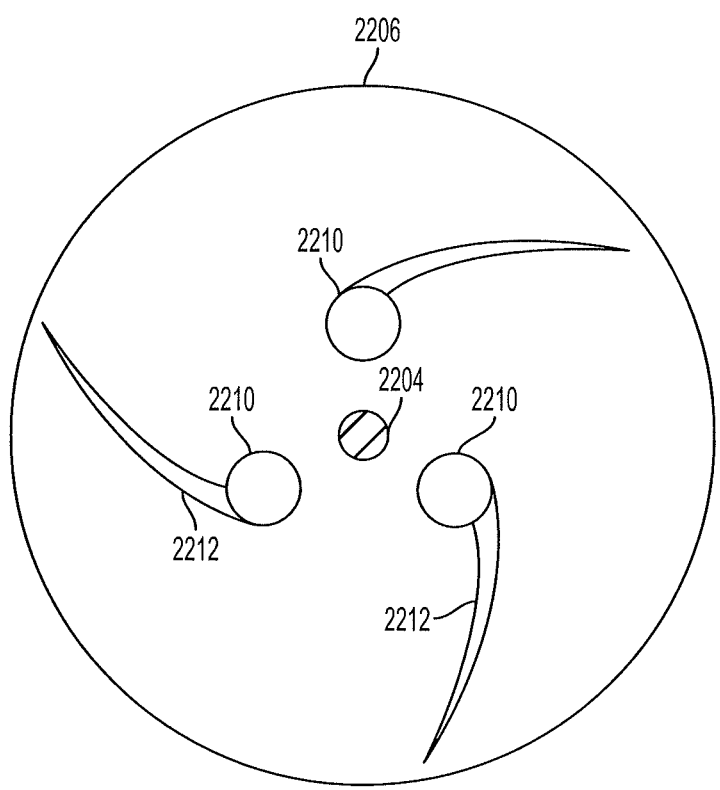
FIG. 22 illustrates an inner disc of the steam turbine, in accordance with various implementations.

In accordance with various implementations, FIG. 22 presents an inner disc 2206 of the steam turbine. The center of the disc 2206 houses main shaft 2204. Disc 2206 may correspond to discs 2106 and main shaft 2204 may correspond to main shaft 2104. Disc 2206 may be made of, for example, ⅛ inch stainless steel Three holes 2210 may be arranged radially around the center of the disc 2206 and may be connected to grooves 2212 cut in the disc 2206.

In accordance with various implementations, FIGS. 23A and 23B depict views of the exhaust and steam turbine. Turbine may comprise turbine housing 2301 containing inner discs 2306. Center of inner disc 2306 may house main shaft 2304. Main shaft 2304 may be configured to be spun by exhaust gas and steam turning inner discs 2306. Main shaft 2304 may further be configured to operate alternator 2350 to convert the mechanical energy of the spinning main shaft 2304 into electrical energy. Turbine may further comprise steam inlet 2308 configured to receive steam into the turbine and exhaust gas inlet 2310 configured to receive exhaust gas into the turbine. Turbine may comprise bearings 2320 configured to support main shaft 2304 and washers 2322 configured to insulate the inside of the turbine from the outside. Turbine may comprise exhaust and steam outlet 2330 configured to direct exhaust gas and steam outputted from the turbine to IC engine 420.

Figure 24:
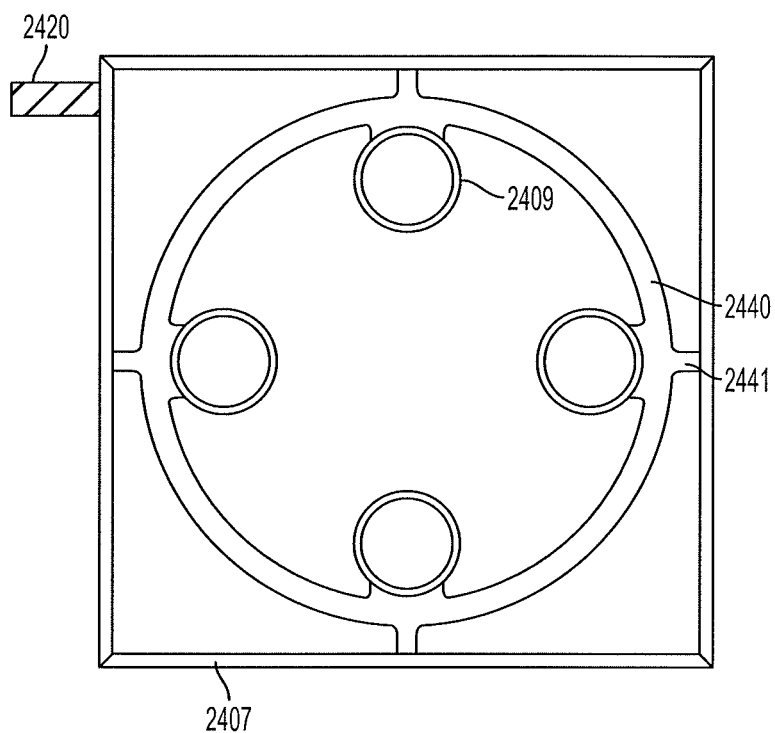
FIG. 24 illustrates a top-down view of the hydrogen cell, in accordance with various implementations.

In accordance with various implementations, FIG. 24 presents a top-down view of a hydrogen cell. The hydrogen cell may comprise cell walls 2407. Cell walls 2407 may be arranged to form a prism and be made of ⅛ inch stainless steel. Cell walls 2407 may be configured to be a cathode. Hydrogen cell may further comprise negative voltage connection 2420 in conductive communication with cell walls 2407. Hydrogen cell may comprise a plurality of cathode inner tubes 2409 arranged within the hydrogen cell. Cathode inner tubes 2409 may be made of, for example, 1/16 thick stainless steel. Hydrogen cell may comprise inner ring 2440 configured to retain cathode inner tubes 2409 within the hydrogen cell. Inner ring 2440 may be configured to provide conductive communication between cathode inner tubes 2409 and cell walls 2407 through connectors 2441.

Figure 25:
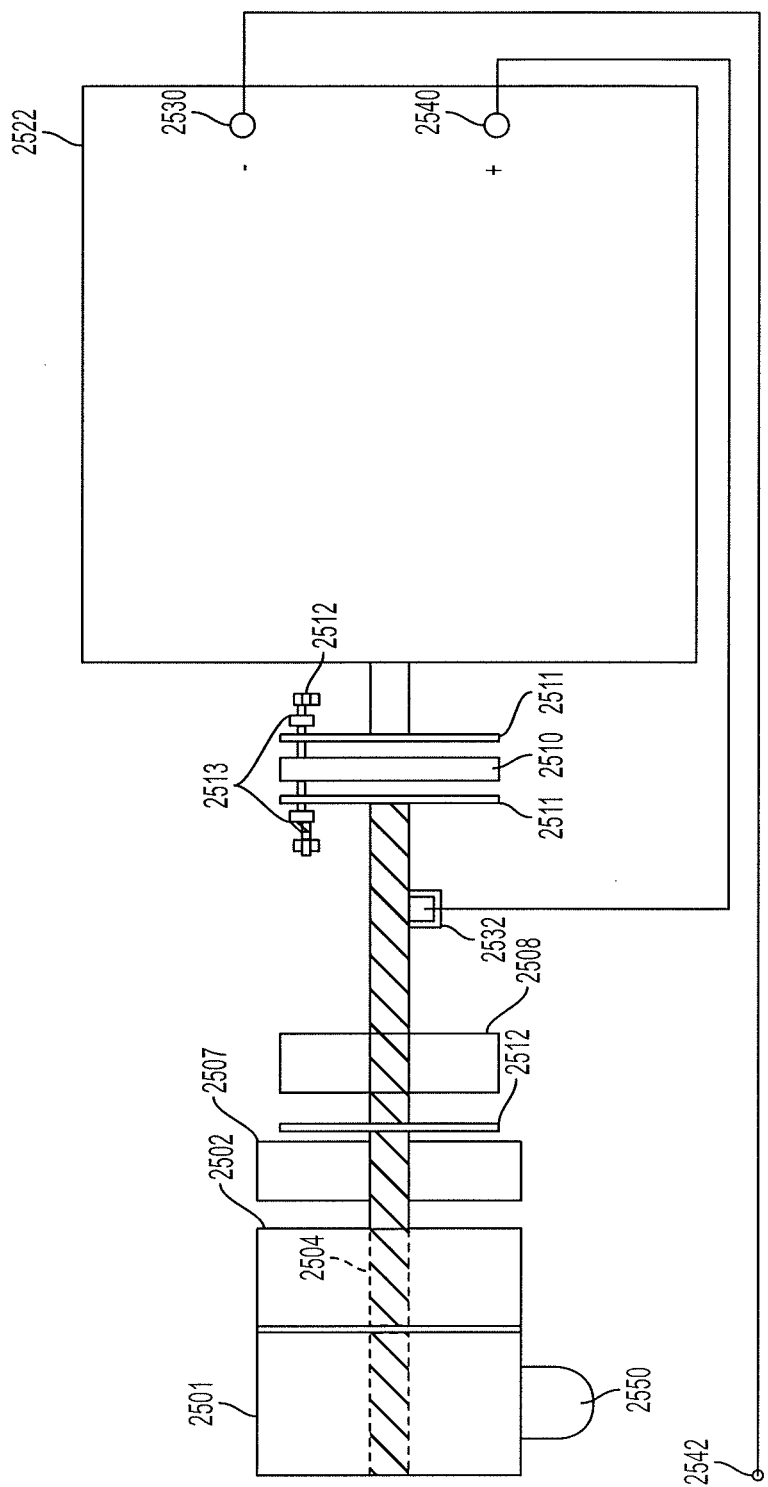
FIG. 25 illustrates the alternator connected to the steam turbine, in accordance with various implementations.

In accordance with various implementations, FIG. 25 illustrates an alternator 2522 connected to a turbine 2501. Turbine 2501 may comprise main shaft 2504. Main shaft 2504 may be spun by exhaust gas and steam providing mechanical energy to turbine 2501. Turbine 2501 may further comprise exhaust outlet 2550 configured to direct exhaust gas and steam from turbine to IC engine 420. Turbine 2501 may comprise inner wall 2502, bearing housing 2507, Teflon® seal 2512, and bearing seal 2508. Bearing housing 2507 may be configured to fit around main shaft 2504 adjacent to inner wall 2502. Bearing housing 2507 may be made of, for example, non-conductive material. Teflon® seal 2512 and bearing seal 2508 are configured to isolate the inside of turbine 2501 from the outside to prevent escape of exhaust gas and steam. Turbine 2501 may also comprise cathode conductor 2542.

Alternator 2522 may comprise non-conductive bushing 2510, plates 2511, bolts 2512, and non-conductive bolt sleeves 2513, all configured to fit around main shaft 2504. Plates 2511 may be configured to fit around non-conductive bushing 2510 by bolts 2512. Non-conductive bolt sleeves 2513 may be configured to fit around bolts 2512. The non-conductive bushing 2510 is configured to allow main shaft 2504 into alternator 2522 while also serving to isolate main shaft 2504 and alternator 2522. Alternator 2522 may be configured to convert the mechanical energy of the spinning main shaft 2504 into electrical energy. Alternator 2522 may further comprise negative output 2530 and positive output 2540. Negative output 2530 may be configured to conductively communicate with anode conductor 2532, which may be electrically coupled to main shaft 2504. Positive output 2540 may be configured to conductively communicate with cathode conductor 2542, which may be electrically coupled to turbine 2501.

Figure 26:
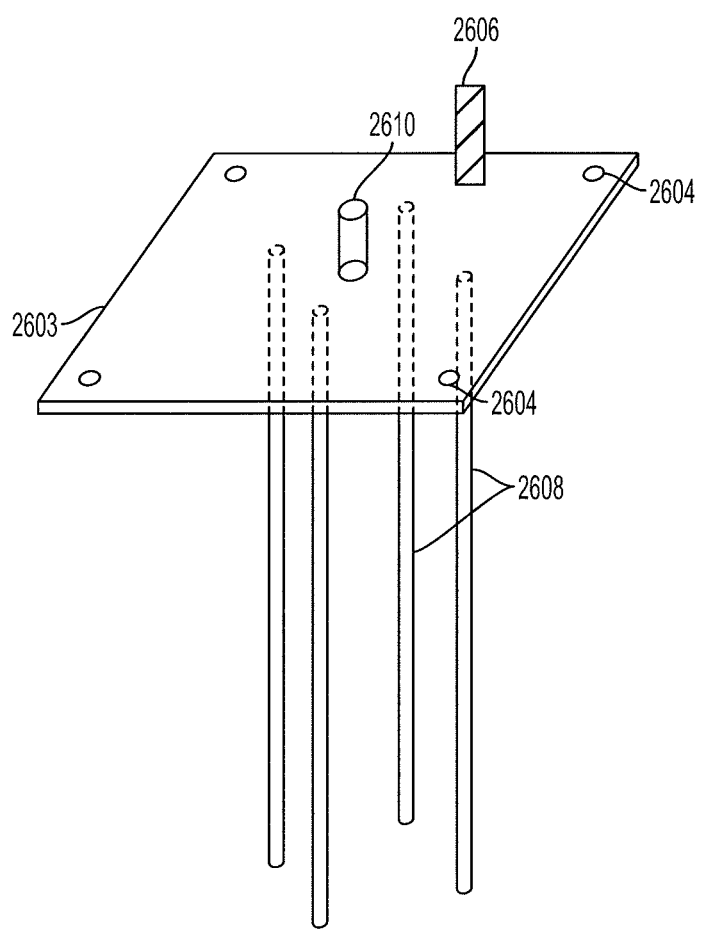
FIG. 26 illustrates a top plate of the hydrogen cell, in accordance with various implementations.

In accordance with various implementations, FIG. 26 presents a top plate 2603 of a hydrogen cell. Top plate 2603 may comprise HHO outlet 2610 configured to output HHO from hydrogen cell. Top plate 2603 may further comprise bolt holes 2604 arranged at the corners of top plate 2603. Anode rods 2608 may extend from top plate 2603 and may be arranged radially around center of top plate 2603. Anode rods 2608 may conductively communicate with top plate 2603. Top plate 2603 may further comprise positive voltage conductor 2606 located on the top surface of top plate 2603.

Figure 27:
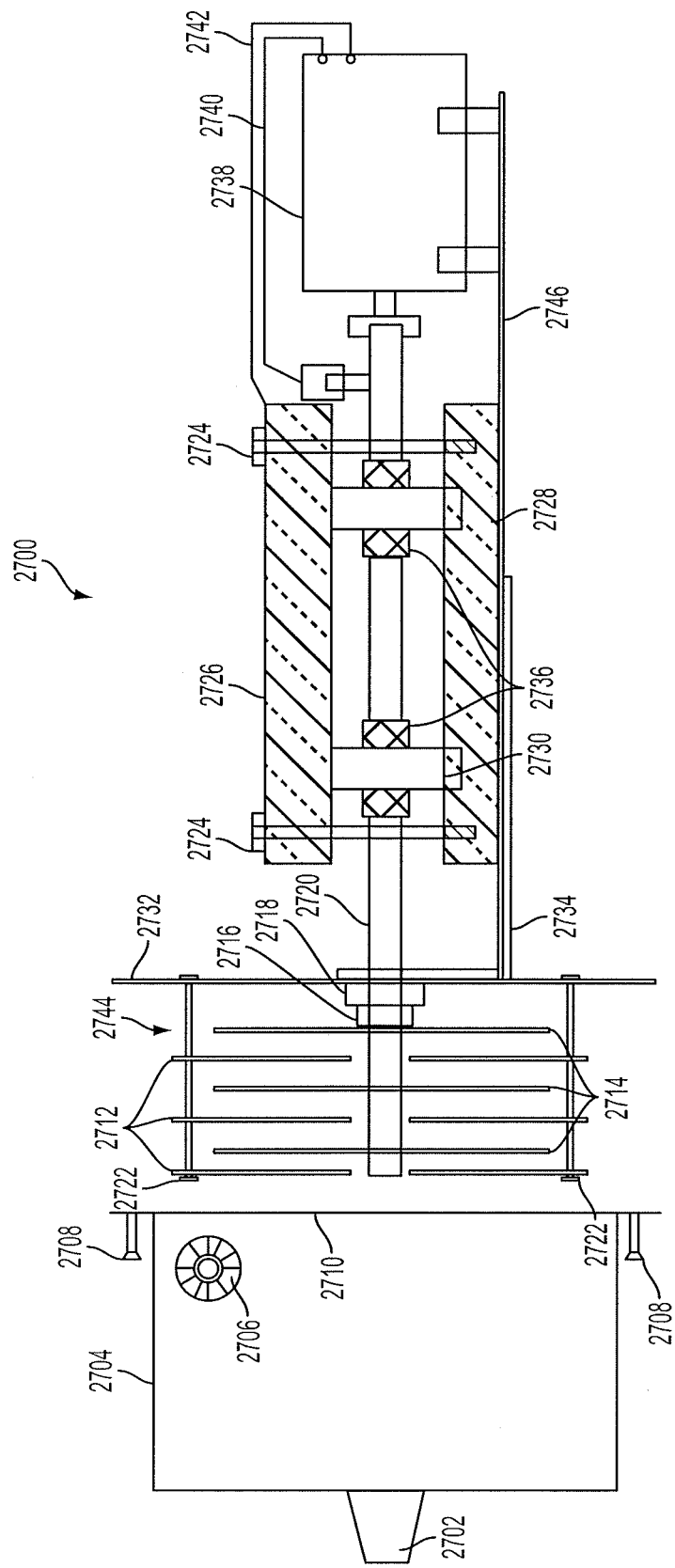
FIG. 27 illustrates a side view of a power generation system, in accordance with various implementations.

In accordance with various implementations, FIG. 27 depicts a side view of a power generation system 2700. A sealing cylinder 2704 is removed to show the components housed within the sealing cylinder 2704.

An exhaust mix including steam and engine exhaust enters the sealing cylinder 2704 through an inlet 2706, and exits via a front nose 2702. The sealing cylinder 2704 is welded or otherwise attached to a plate 2710. The plate 2710 is attached to the backing plate 2732 with bolts 2708 to form a sealed unit area 2744 within the sealing cylinder 2704. Once sealed, the sealed unit area 2744 is airtight such that the exhaust mix can only enter through the inlet 2706 and exit through the front nose 2702.

A portion of a shaft 2720 is housed within the sealing cylinder 2704. The shaft 2720 can rotate while within the sealing cylinder 2704. In FIG. 27, three rotating discs 2714 are attached to the shaft 2720 and rotate with the shaft 2720. The rotating discs 2714 may be evenly spaced apart, as in FIG. 27. However, in other implementations, more or less than three rotating discs 2714 may be used, and may be spaced unevenly.

The rotating discs 2714 are separated by stationary dividers 2712. Unlike the rotating discs 2714, the stationary dividers 2712 do not rotate with the shaft 2720. The stationary dividers 2712 are affixed to the backing plate 2731 through bolts 2722 and remain stationary. In FIG. 27, three evenly spaced stationary dividers 2712 separate the three rotating discs 2714. In other implementations, any appropriate number of stationary dividers 2712 may be appropriately spaced to separate the rotating discs 2714.

An O-ring 2716, which may be rubber, is adjacent to the rotating disc 2714 nearest the backing plate 2732. The O-ring 2716 helps prevent the rotating disc 2714 from shifting or otherwise move in an unintended way. The O-ring 2716 also seals the sealed unit area 2744 to prevent the exhaust mix from escaping through a hole for the shaft 2720. A seal 2718, which may be a plastic or rubber material such as Teflon®, is between the O-ring 2716 and the backing plate 2732 to help seal the sealed unit area 2744 while allowing the shaft 2720 to rotate.

The shaft 2720 is supported by bearings 2730. Sleeves 2736, which may be a plastic or rubber material such as Teflon®, isolate the shaft 2720 from the bearings 2730 to allow the shaft 2720 to freely rotate. The bearings 2730 are held in place by an upper channel 2726 and a lower channel 2728. The upper channel 2726 and the lower channel 2728 are held together by bolts 2724, sandwiching the bearings 2730 between the upper channel 2726 and the lower channel 2728. The upper channel 2726 is attached through bolts 2724, rather than welded. The use of bolts 2724 allows removal of the upper channel 2726 to access and remove the shaft 2720 when necessary, such as for repairs or cleaning.

The lower channel 2728 is connected to the sealed unit area 2744 through a support 2734. The support 2734, made of steel, is welded or otherwise permanently attached to the bottom of the lower channel 2728 and the backing plate 2732.

A support 2746, made of steel, connects the lower channel 2728 to a motor 2738. The shaft 2720 is mechanically coupled to the motor 2738. The motor 2738 is electrically coupled to the shaft 2720 through a wire 2740, and connected to a ground, such as the upper channel 2726, through a ground wire 2742. The motor 2738 may be a permanent magnet motor such as a small DC motor, capable of producing a few amps, such as 3 amps.

Figure 28A:
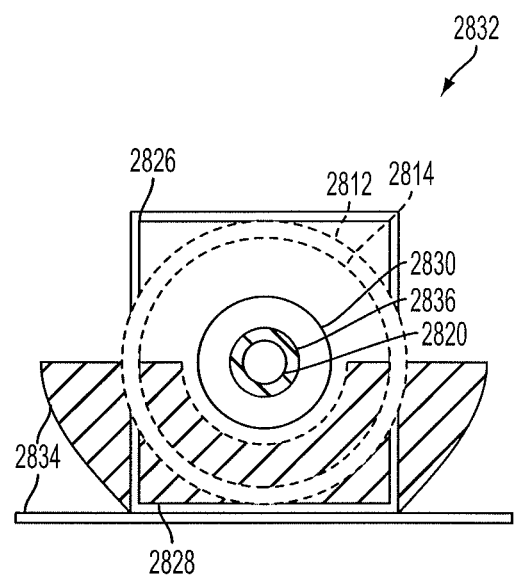
FIG. 28A illustrates a back view of a sealed unit are of the power generation system of FIG. 27, in accordance with various implementations.

In accordance with various implementations, FIG. 28A illustrates a back view of a power generation system. A backing plate 2832 may correspond to the backing plate 2732 in FIG. 27 as viewed from the back, i.e. looking from the right side into the left side of FIG. 27. A shaft 2820, which may correspond to the shaft 2720, has a sleeve 2836, which may correspond to the sleeve 2736, and is supported by a bearing 2830, which may correspond to the bearing 2730. The bearing 2830 is held in place by an upper channel 2826, which may correspond to the upper channel 2726, and a lower channel 2828, which may correspond to the lower channel 2728. Outlines of a rotating disc 2814, which may correspond to the rotating disc 2714, and a stationary divider 2812, which may correspond to the stationary divider 2712, are shown for comparison. The stationary divider 2812 has a larger radius than that of the rotating disc 2814 to more effectively separate the rotating discs 2814.

The lower channel 2828 is welded to a support 2834, which may correspond to the support 2734. The support 2834 supports the bearing 2830 and the shaft 2820, and is attached to the backing plate 2832. The support 2834 has a semicircular portion directly welded flat against the backing plate 2832, and connected to another portion perpendicular to the semicircular portion. The support 2834 may be made of angle iron or stainless steel, and may be thicker than the backing plate 2832 for added support. For instance, the backing plate 2832 may be 1/16 of an inch thick whereas the support 2834 may be 1/8 of an inch thick.

Figure 28B:
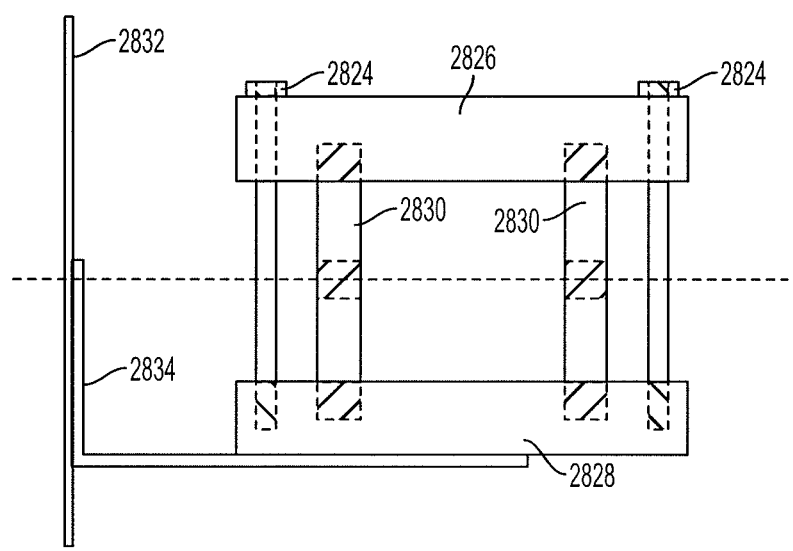
FIG. 28B illustrates a side view of the sealed unit area in FIG. 28A, in accordance with various implementations.

In accordance with various implementations, FIG. 28B presents a side view of FIG. 28A, with the shaft 2820 removed. The support 2834, which may be a reinforced steel brace, connects the backing plate 2832 and a lower channel 2828. The upper channel 2826 is connected to the lower channel 2828 through bolts 2824 to hold the bearings 2830. The support 2834 is welded or bolted to the backing plate 2832 and the lower channel 2828. The upper channel 2826 is attached through bolts 2824 such that the upper channel 2826 and the bearings 2830 can be removed when necessary.

Figure 29B:
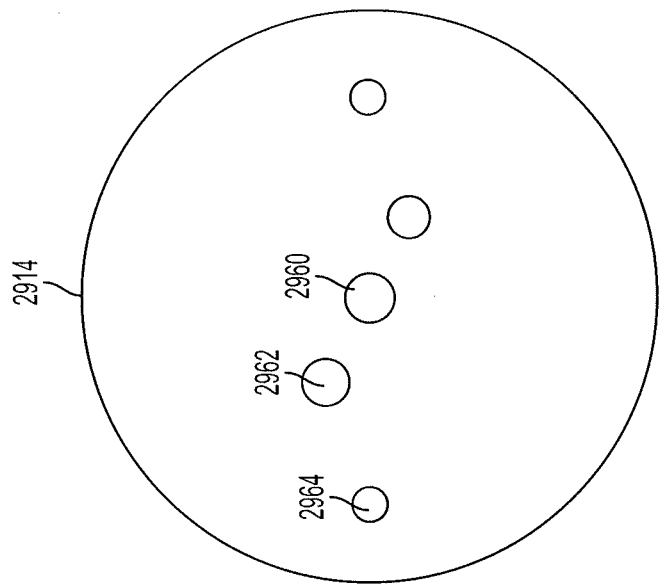
FIG. 29B illustrates a rotating disc, in accordance with various implementations.
Figure 29A:
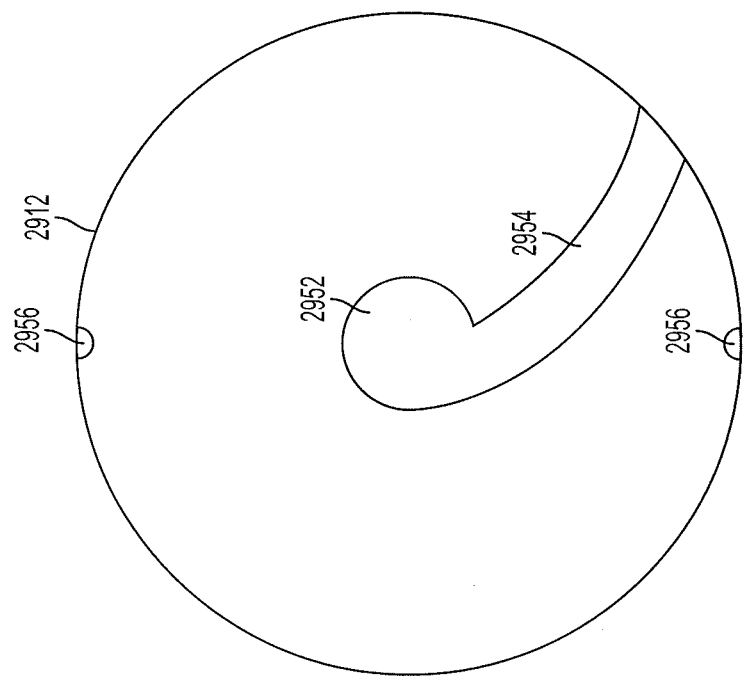
FIG. 29A illustrates a stationary divider, in accordance with various implementations.

In accordance with various implementations, FIG. 29A presents a stationary divider 2912, which may correspond to the stationary divider 2712 in FIG. 27. The stationary divider 2912 is held stationary by bolts through bolt holes 2956. The stationary divider 2912 has a shaft hole 2952 at its center, and a cutout 2954 radiating out from the shaft hole 2952. The stationary divider 2912 can be slid around the shaft 2720 through the cutout 2954. Once the shaft 2720 is positioned within the shaft hole 2952, the stationary divider 2912 can be attached to the backing plate 2732 by bolts 2722 extending through the bolt holes 2956. The shaft hole 2952 has a radius greater than that of the shaft 2720 to allow the shaft 2720 enough room to rotate without interference.

In accordance with various implementations, FIG. 29B presents a rotating disc 2914, which may correspond to the rotating disc 2714 in FIG. 27. The rotating disc 2914 has several holes 2962 and 2964, arranged radially around a center of the rotating disc 2914. A shaft hole 2960, in the center of the rotating disc 2914, has a radius similar to that of the shaft 2720 such that the rotating disc 2914 is attached to the shaft 2720. The rotating disc 2914 rotates, which also rotates the shaft 2720. The rotating disc 2914 also has a smaller radius than that of the stationary divider 2912, such that the stationary divider 2912 more effectively divides the space between rotating discs 2914.

Figure 30B:
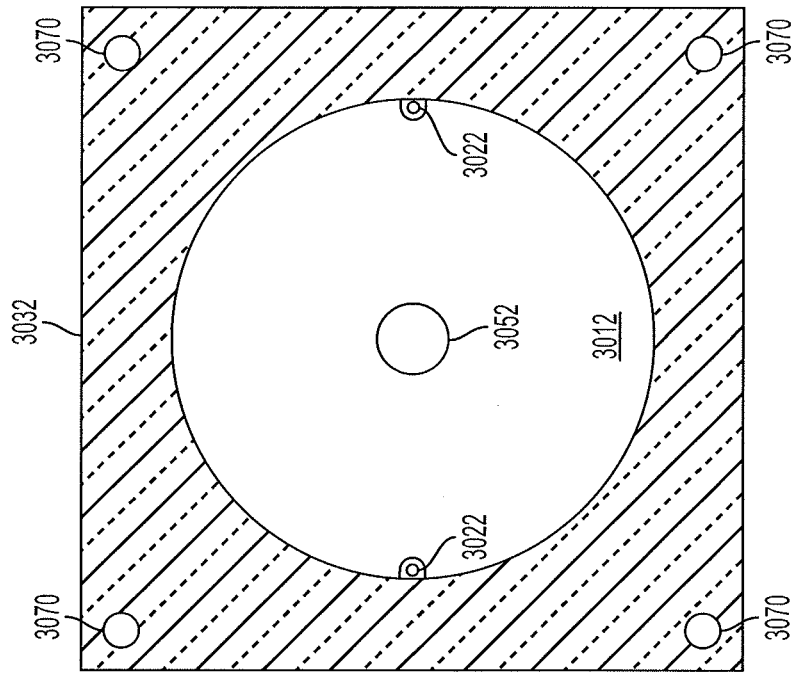
FIG. 30B illustrates a front view of a backing plate of the sealed unit area, in accordance with various implementations.
Figure 30A:
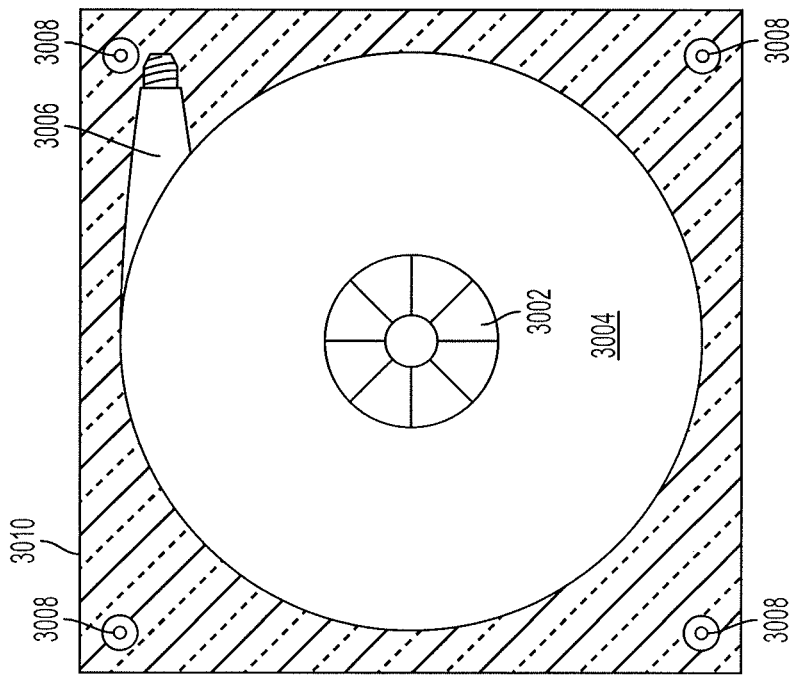
FIG. 30A illustrates a front view of the sealed unit area, in accordance with various implementations.

In accordance with various implementations, FIG. 30A illustrates an exterior front view of a sealed unit area, which may correspond to the sealed unit area 2744 in FIG. 27. A plate 3010, which may correspond to the plate 2710, has a square shape, with bolts 3008 in each corner. A sealing cylinder 3004, which may correspond to the sealing cylinder 2704, is attached to the plate 3010. The sealing cylinder 3004 has a front nose 3002, which may correspond to the front nose 2702, and an inlet 3006, which may correspond to the inlet 2706. The front nose 3002 may be about an inch thick. The plate 3010 is sealed to a backing plate 3032 in FIG. 30B, through bolts 3008 extending through bolt holes 3070.

In accordance with various implementations, FIG. 30B illustrates the backing plate 3032, which may correspond to the backing plates 2732 and 2832. The backing plate 3032 has a square shape with bolt holes 3070 in each corner, similar to the plate 3010, for mating and sealing. A stationary divider 3012, which may correspond to the stationary divider 2712 and 2912, is also shown. The stationary divider 3012 has a shaft hole 3052 to allow the shaft 2720 to rotate within. The stationary divider 3012 is attached to the backing plate 3032 through bolts 3022. A radius of the stationary divider 3012 corresponds to a radius of the sealing cylinder 3004, such that the stationary divider 3012 provides divisions between rotating discs 2714.

Figure 31:
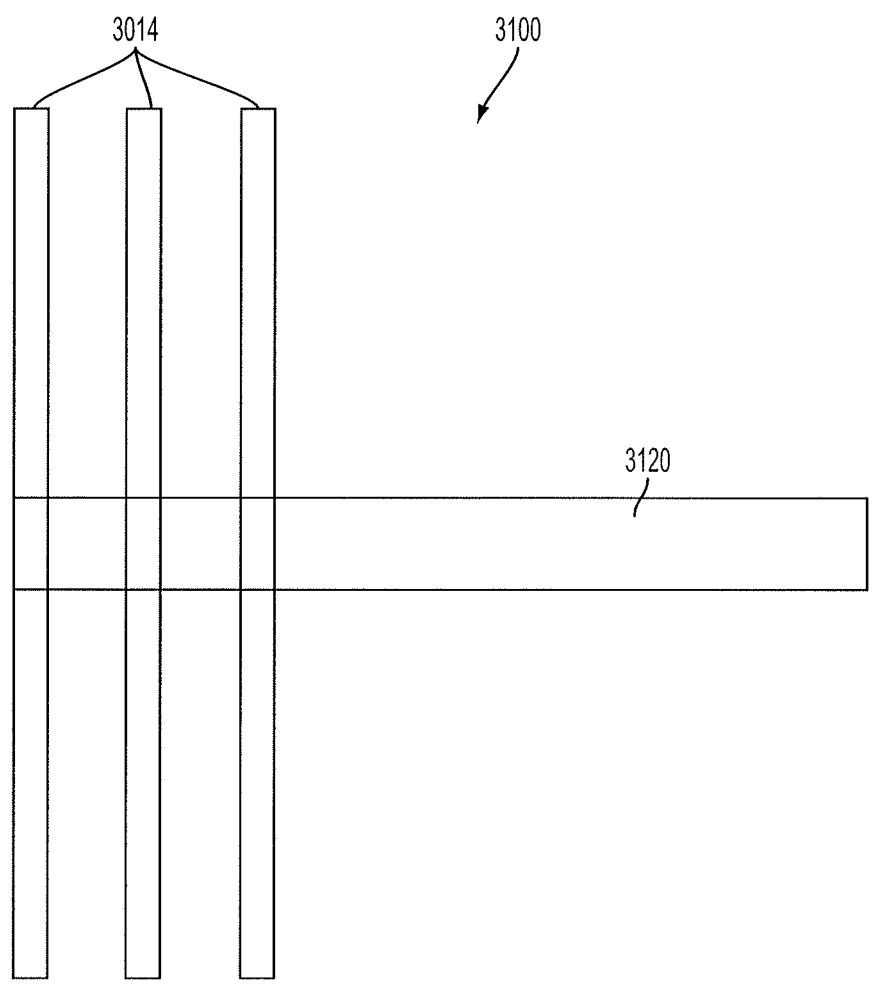
FIG. 31 illustrates a side view of a rotating assembly, in accordance with various implementations.

In accordance with various implementations, FIG. 31 depicts a rotating assembly 3100. The rotating assembly 3100 may correspond to the moving parts of the power generation system 2700 in FIG. 27. In other words, the non-bolted or non-welded parts of the power generation system 2700 may comprise the rotating assembly 3100. The rotating assembly 3100 includes a shaft 3120, which may correspond to the shaft 2720, and a rotating disc 3014, which may correspond to the rotating disc 2714 and the rotating disc 2914. The rotating discs 3014 rotate together with the shaft 3120. The rotating assembly 3100 may be cut from a single piece of material, such as steel, or may be separate components welded or otherwise attached together. The rotating assembly 3100 may be placed into the bearings 2730 for operation.

Returning to FIG. 27, the motor 2738 is powered by rotations of the shaft 2720. The exhaust mix, which may comprise spent gases and exhaust from the engine as well as steam from the boiler, enters through the inlet 2706. When sufficient pressure builds, the exhaust mix causes the rotating discs 2714 to spin. The spinning energizes the power generation system 2700, which acts to convert the exhaust mix into cleaner fuel. Specifically, the rotating shaft 2720 drives the motor 2738. Once the motor 2738 is running, it provides an electrical charge to the shaft 2720 via the wire 2740. The charged, spinning shaft 2720 fractures the exhaust mix via electrolysis to produce a hydrogen mix (or mixture or gas) of hydrogen gas, exhaust and steam. The hydrogen mix then exits via the front nose 2702. The hydrogen mix can be fed into the engine through a butterfly valve connected to the intake manifold of the engine. The hydrogen mix comes into the intake flow and is re-burned by the engine. This re-burning of the exhaust is more fuel efficient.

The shaft 2720 may rotate at about 15,000-20,000 rpm to power the motor 2738. The power generated by the motor 2738 can reduce the load of the generator. The motor 2738 may generate enough electricity to use hydrogen cells.

The power generation process may start with supplying hydrogen to the engine. Once the engine is up to speed in heat, the exhaust from the engine may power the motor 2738. The power generation system 2700 may then produce power to lessen the load on the generators, as well as provide the hydrogen mix for the engine to re-burn. Thus, the power generation system 2700 increases efficiency. The energy recovered from the heat of the exhaust leads to a net energy gain.

EXAMPLES

In accordance with various implementations of the present disclosure the Hydrogen IC engine generator may consume 32,000 BTU's to generate 1 kWh. While it may be noted that various elements, systems, and subsystems disclosed herein may be incorporated in any combination. The individual systems may provide substantial benefits for the economic production of energy.

While it may be noted that the various systems as discussed herein are described as electric power production systems, it may be understood by a person of ordinary skill in the art that the various systems, subsystems, elements or devices may be incorporated with any IC engine in any setting to provide the indicated benefits. For example, the fuel cell may be incorporated in a truck's IC engine to provide hydrogen fuel in addition to a first fuel such as natural gas.

Benefits, other advantages, and solutions to problems have been described herein with regard to specific implementations. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims or specification, it is intended that the phrase be interpreted to mean that A alone may be present in various implementations, B alone may be present in various implementations, C alone may be present in various implementations, or that any combination of the elements A, B and C may be present in a single implementation; for example, A and B, A and C, B and C, or A and B and C. All structural, chemical, and functional equivalents to the elements of the above-described exemplary implementations that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

What is claimed is:

1. A power generation system comprising:
   an engine configured to combust hydrogen and produce an engine exhaust;
   a sealed unit area having an inlet and an outlet for the engine exhaust;
   a shaft having a portion disposed within the sealed unit area and configured to rotate;
   a plurality of rotating discs disposed within the sealed unit area and attached to the shaft such that the plurality of rotating discs rotate with the shaft when the engine exhaust enters the sealed unit area; and
   a motor powered by the shaft and electrically connected to the shaft;
   wherein the shaft is electrically charged by the motor to fracture the engine exhaust via electrolysis, and wherein the fractured engine exhaust is re-burned by the engine.

2. The power generation system of claim 1 wherein the outlet is configured to direct the fractured engine exhaust to the engine.

3. The power generation system of claim 1 wherein the plurality of rotating discs are separated by a plurality of stationary dividers.

4. The power generation system of claim 3 wherein the plurality of stationary dividers are attached to the sealed unit area to be held in place while the shaft and the plurality of rotating discs rotate.

5. The power generation system of claim 4 wherein the plurality of stationary dividers are discs with radii greater than a radii of the plurality of rotating discs.

6. The power generation system of claim 1 wherein the motor is a DC motor.

7. The power generation system of claim 1 wherein the shaft is supported by a plurality of bearings.

8. The power generation system of claim 7 wherein the bearings are held in place by an upper channel and a lower channel.

9. The power generation system of claim 8 wherein the motor is electrically connected to the upper channel through a ground wire.

* * * * *